US009885843B2

(12) United States Patent
Bhagavatula et al.

(10) Patent No.: US 9,885,843 B2
(45) Date of Patent: Feb. 6, 2018

(54) FORMING A FIBER BULGE IN AN OPTICAL FIBER END FOR POSITIONING THE OPTICAL FIBER IN A FERRULE BORE

(71) Applicant: Corning Optical Communications LLC, Hickory, NC (US)

(72) Inventors: Venkata Adiseshaiah Bhagavatula, Big Flats, NY (US); Woraphat Dockchoorung, Corning, NY (US); Riley Saunders Freeland, Corning, NY (US); Klaus Hartkorn, Painted Post, NY (US)

(73) Assignee: Corning Optical Communications LLC, Hickory, NC (US)

( * ) Notice: Subject to any disclaimer, the term of this patent is extended or adjusted under 35 U.S.C. 154(b) by 0 days.

(21) Appl. No.: 15/606,380

(22) Filed: May 26, 2017

(65) Prior Publication Data
US 2017/0343749 A1    Nov. 30, 2017

Related U.S. Application Data

(60) Provisional application No. 62/343,356, filed on May 31, 2016.

(51) Int. Cl.
*G02B 6/42*   (2006.01)
*G02B 6/38*   (2006.01)

(52) U.S. Cl.
CPC .......... *G02B 6/4296* (2013.01); *G02B 6/3855* (2013.01); *G02B 6/3887* (2013.01); *G02B 6/3851* (2013.01)

(58) Field of Classification Search
CPC .. G02B 6/25; G02B 6/02366; G02B 6/02376; G02B 6/3861; G02B 6/3821;
(Continued)

(56) References Cited

U.S. PATENT DOCUMENTS 4,458,983 A * 7/1984 Roberts ............... G02B 6/3834
                                                        385/62
4,755,203 A * 7/1988 Coutts ................. G02B 6/2552
                                                        219/121.25
(Continued)

FOREIGN PATENT DOCUMENTS

DE    4142845 A1    6/1993
GB    2110835 A     6/1983
(Continued)

OTHER PUBLICATIONS

International Search Report and Written Opinion PCT/US2017/034994 dated Sep. 4, 2017.

*Primary Examiner* — Akm Enayet Ullah
(74) *Attorney, Agent, or Firm* — Adam R. Weeks

(57) ABSTRACT

A fiber bulge ("bulge") formed in an end of an optical fiber for positioning the optical fiber in a ferrule bore is disclosed. An energy source is controlled to direct focused energy to the end of the optical fiber extended from the front end face of the ferrule to expose and melt the end of the optical fiber into a bulge of desired geometry and size. The bulge comprises a cross-sectional region having an outer surface having a minimum outer diameter larger than the inner diameter of the ferrule bore. Thus, the optical fiber may be pulled back in the ferrule bore such that at least a portion of the outer surface of the interface region of the bulge interferes with and engages the front opening of the ferrule bore to position the fiber core within the ferrule bore.

24 Claims, 17 Drawing Sheets

(58) Field of Classification Search
CPC .. G02B 6/3887; G02B 6/4296; G02B 6/3855; G02B 6/3851
See application file for complete search history.

(56) References Cited

U.S. PATENT DOCUMENTS

| | | | | |
|---|---|---|---|---|
| 5,226,101 | A | * | 7/1993 | Szentesi ................ B24B 19/226 219/121.17 |
| 5,917,985 | A | | 6/1999 | Im |
| 8,132,971 | B2 | | 3/2012 | Luther et al. |
| 8,915,100 | B2 | * | 12/2014 | Tachikura .......... G02B 6/02366 65/384 |
| 9,205,610 | B1 | | 12/2015 | Danley |
| 9,239,435 | B2 | * | 1/2016 | Takahashi ............ G02B 6/3861 |
| 2005/0141817 | A1 | * | 6/2005 | Yazaki ................ G02B 6/3825 385/78 |
| 2010/0080511 | A1 | * | 4/2010 | Luther ................ G02B 6/3834 385/60 |
| 2013/0028561 | A1 | | 1/2013 | Luther et al. |
| 2015/0218038 | A1 | * | 8/2015 | Carberry ................ C03B 37/16 65/392 |
| 2015/0301292 | A1 | * | 10/2015 | Danley ................ G02B 6/3861 156/278 |
| 2016/0341915 | A1 | * | 11/2016 | Boldicke .............. G02B 6/423 |
| 2017/0031110 | A1 | * | 2/2017 | Bhagavatula ........ G02B 6/3898 |
| 2017/0176692 | A1 | * | 6/2017 | Gregorski ............ G02B 6/3834 |

FOREIGN PATENT DOCUMENTS

| | | | |
|---|---|---|---|
| JP | 53144348 | A | 12/1978 |
| JP | 10048461 | A | 2/1998 |
| JP | 2004012878 | A | 1/2004 |
| JP | 2005062338 | A | 3/2005 |

* cited by examiner

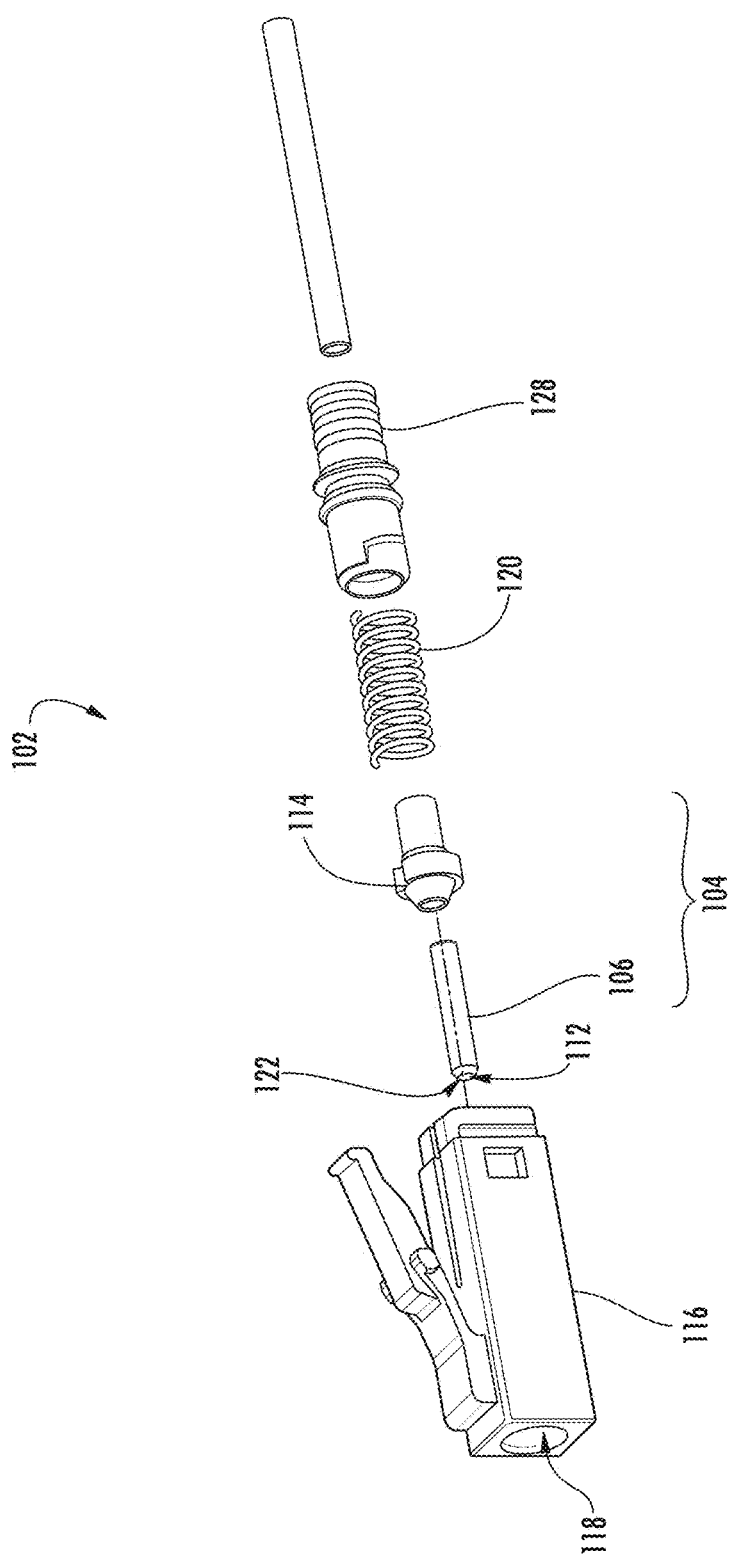

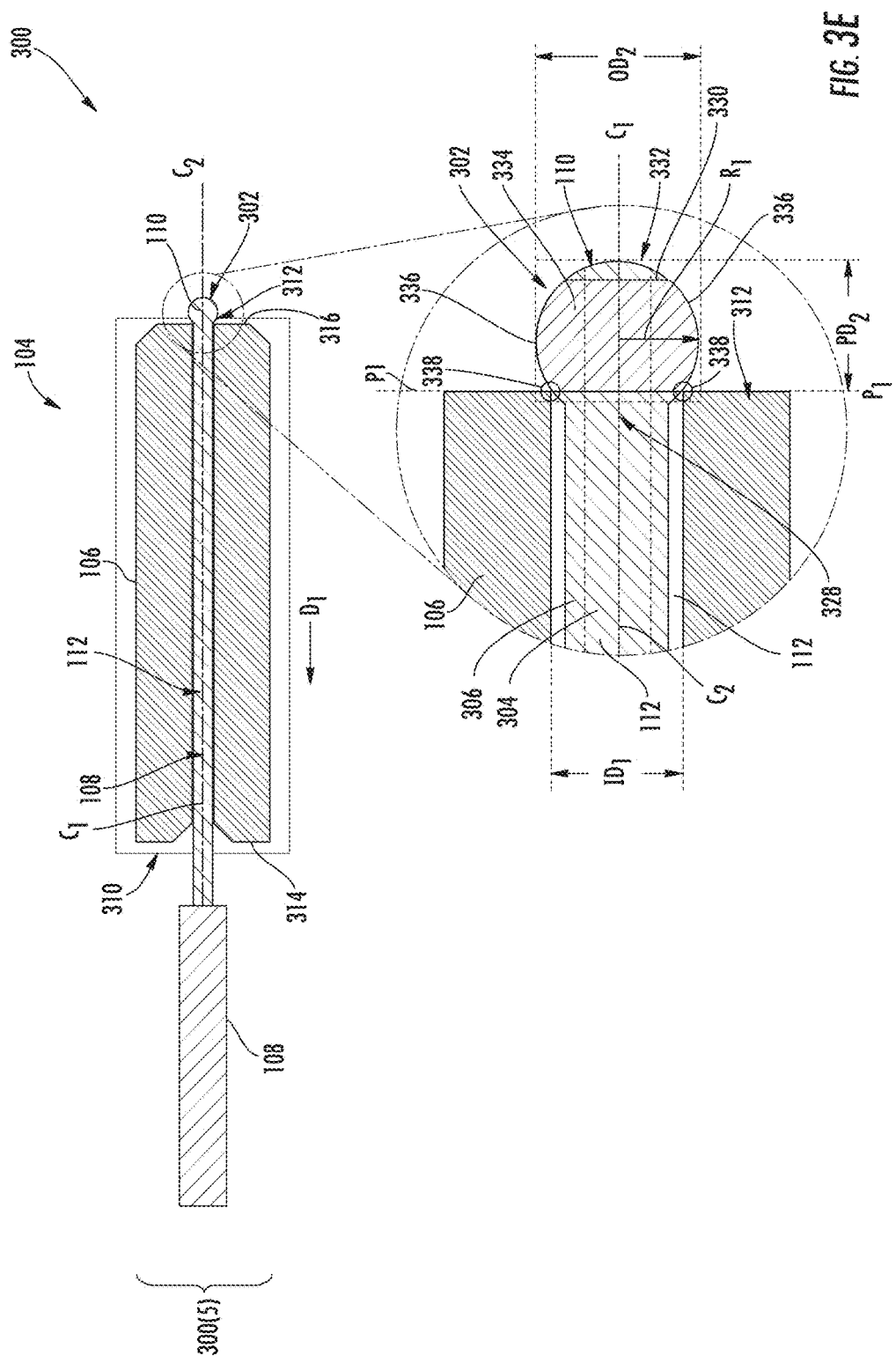

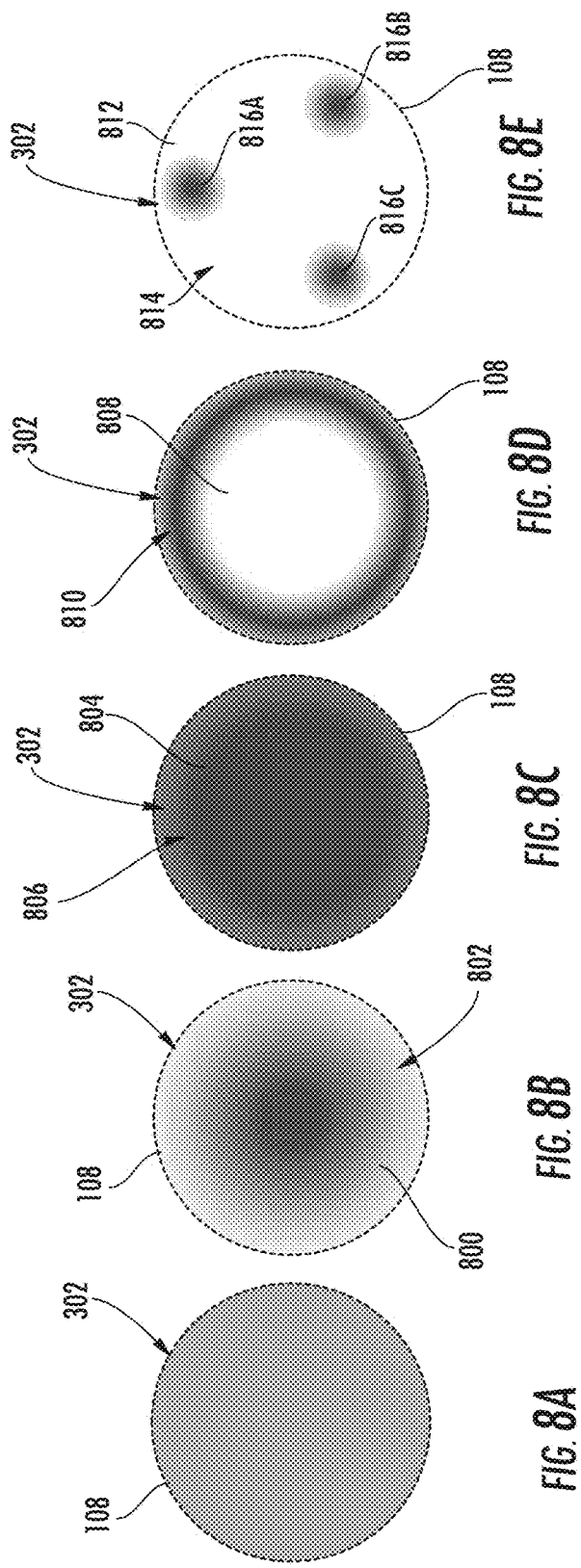

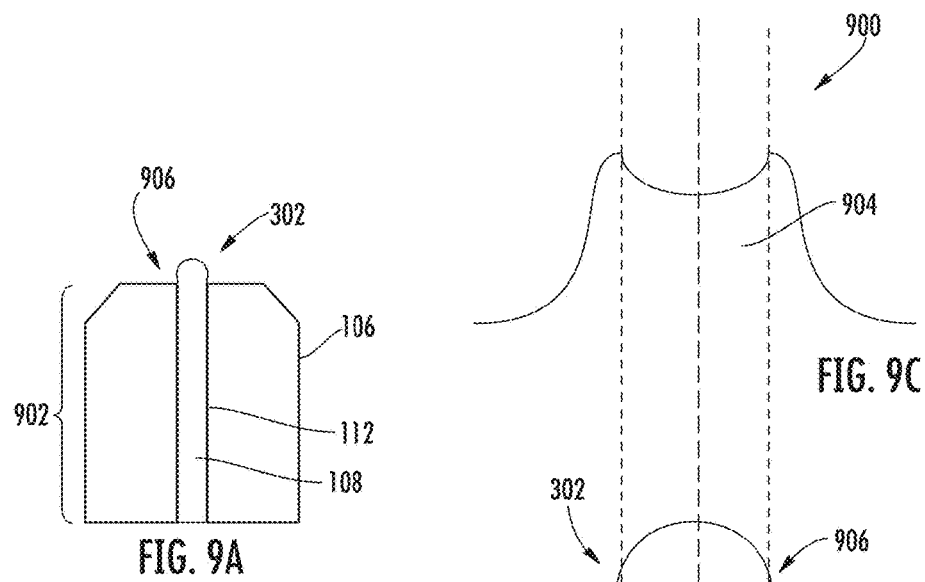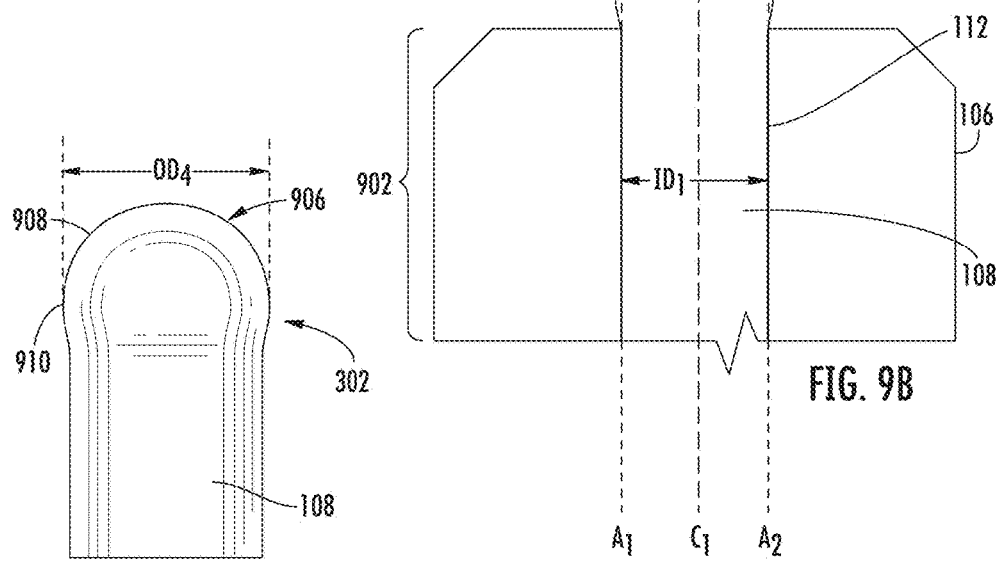

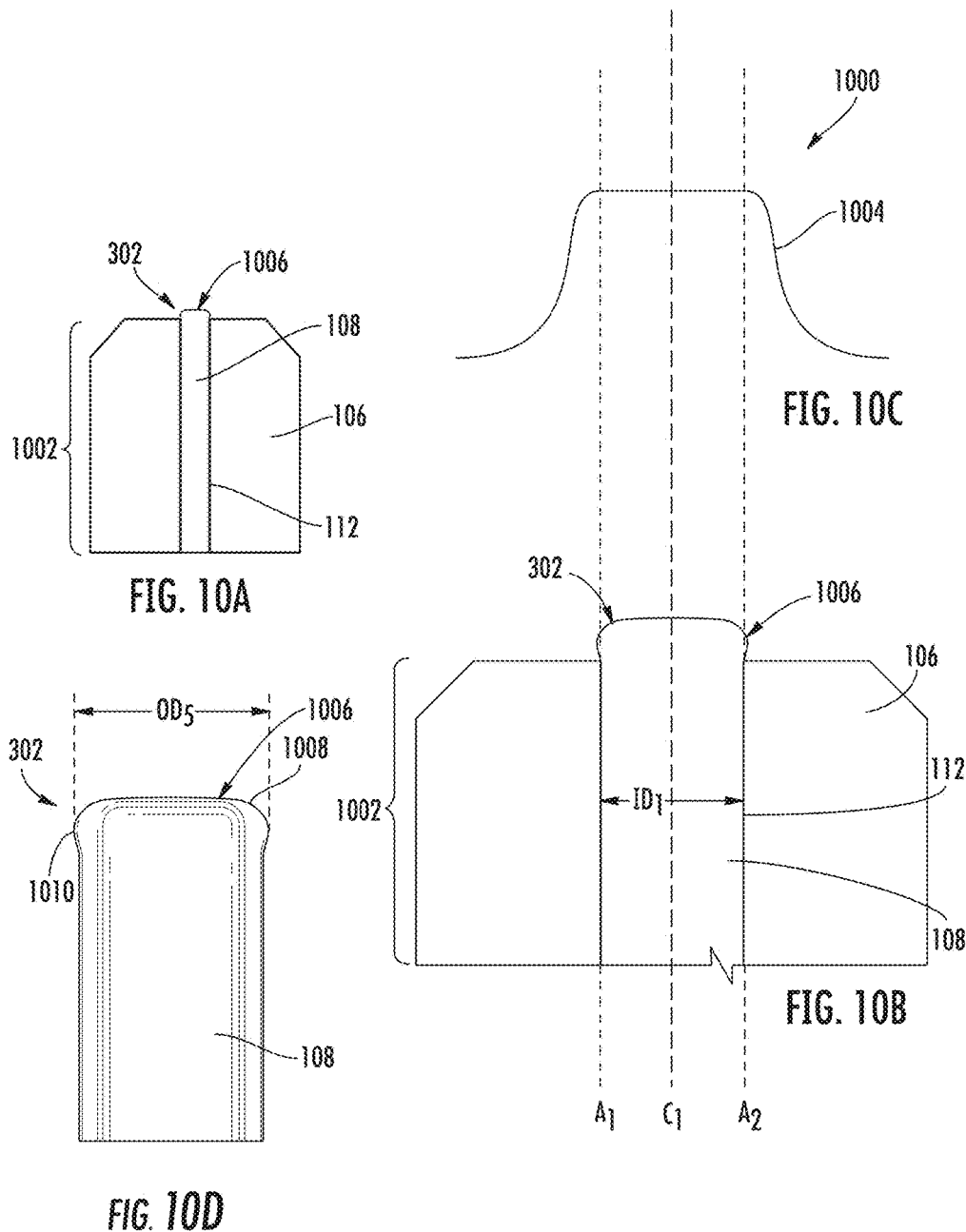

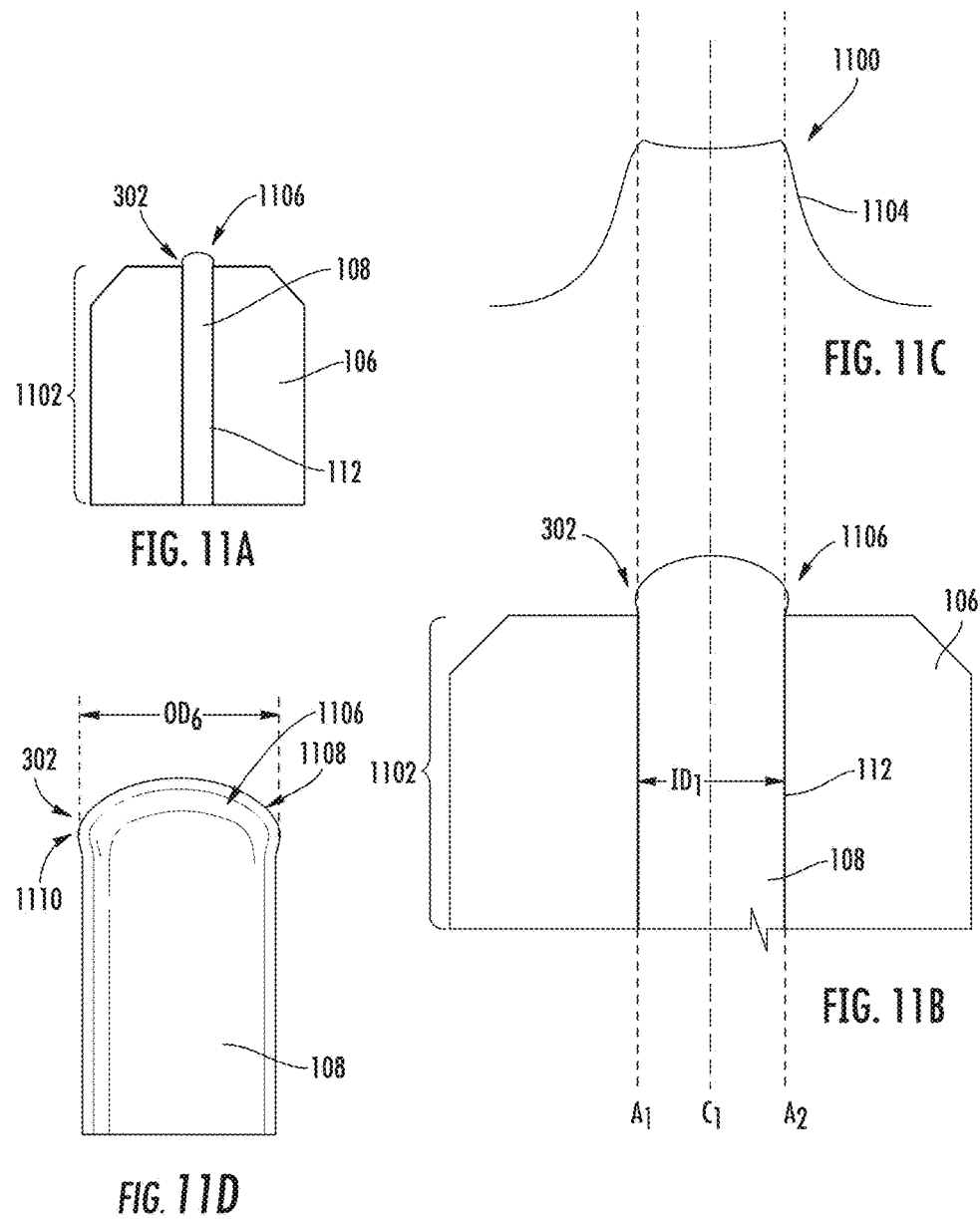

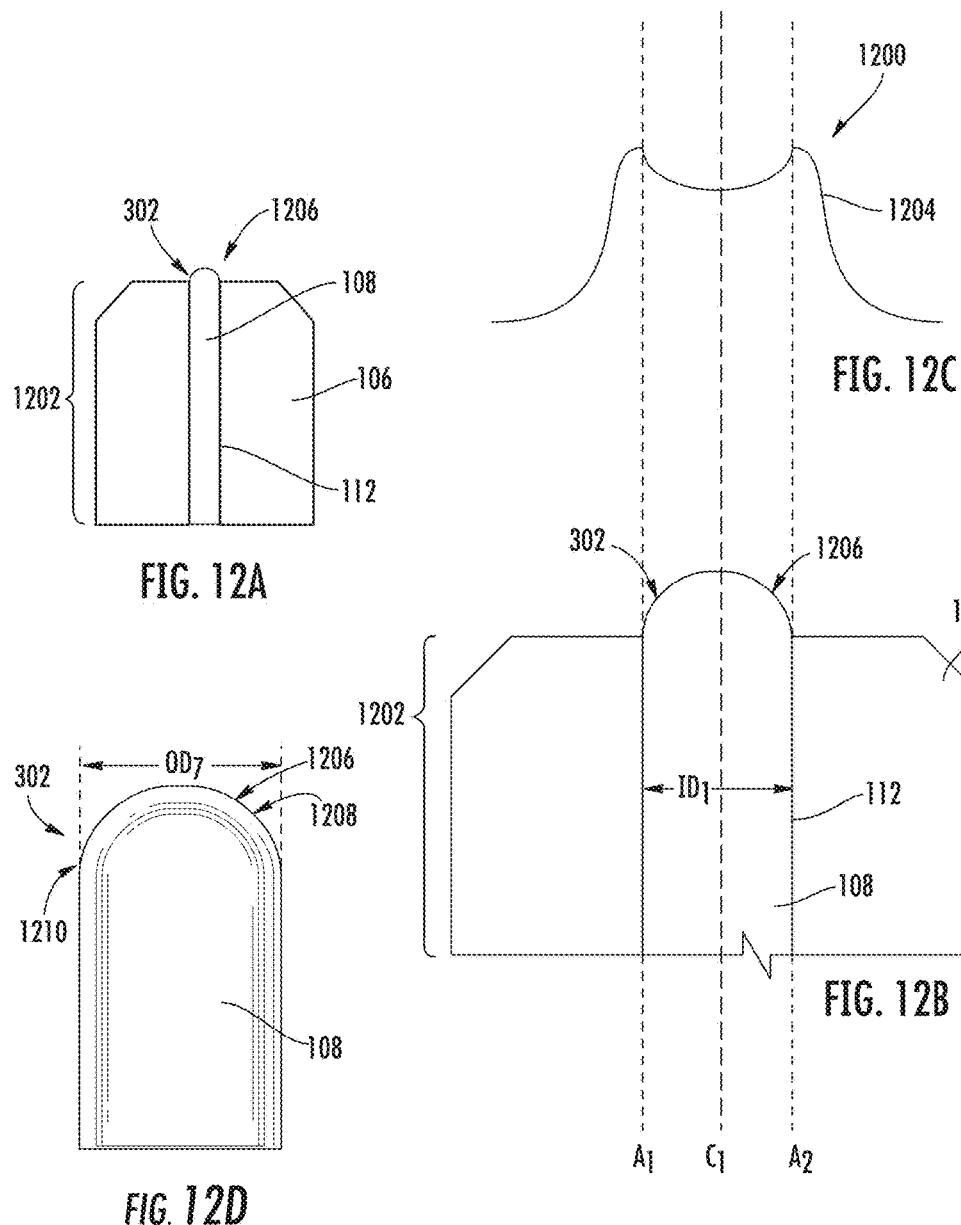

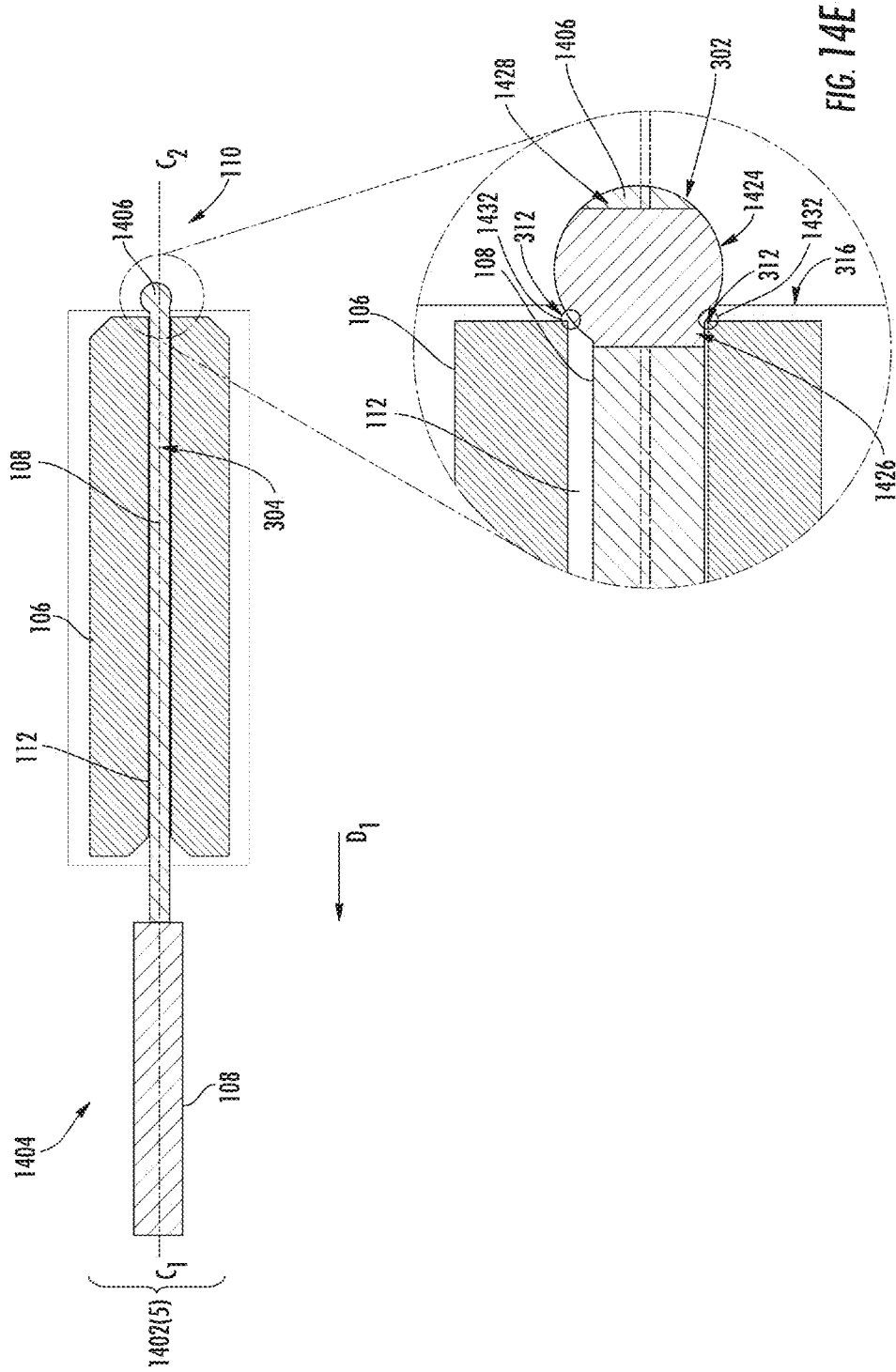

FORMING A FIBER BULGE IN AN OPTICAL FIBER END FOR POSITIONING THE OPTICAL FIBER IN A FERRULE BORE

CROSS-REFERENCE TO RELATED APPLICATIONS

This application claims the benefit of priority under 35 U.S.C §119 of U.S. Provisional Application No. 62/343,356, filed on May 31, 2016 the content of which is relied upon and incorporated herein by reference in its entirety.

BACKGROUND

This disclosure relates generally to connectorization of optical fibers in fiber optic connectors, and more particularly to forming a fiber bulge in an end of an optical fiber to position the optical fiber in a ferrule bore of a ferrule assembly to improve insertion loss.

Optical fibers are useful in a wide variety of applications, including the telecommunications industry for voice, video, and data transmissions. In a telecommunications system that uses optical fibers, there are typically many locations where fiber optic cables that carry the optical fibers connect to equipment or other fiber optic cables. To conveniently provide these connections, fiber optic connectors are often provided on the ends of fiber optic cables. The process of terminating individual optical fibers from a fiber optic cable is referred to as "connectorization." Connectorization can be done in a factory, resulting in a "pre-connectorized" or "pre-terminated" fiber optic cable, or the field (e.g., using a "field-installable" fiber optic connector).

Regardless of where installation occurs, a fiber optic connector typically includes a ferrule with one or more bores that receive one or more optical fibers. The ferrule supports and positions the optical fiber(s) with respect to a housing of the fiber optic connector. Thus, when the housing of the fiber optic connector is mated with another connector (e.g., in an adapter), an optical fiber in the ferrule is positioned in a known, fixed location relative to the housing. This allows an optical connection to be established when the optical fiber is aligned with another optical fiber provided in the mating connector.

Each bore of the ferrule in a fiber optic connector typically extends to a front end face of the ferrule. With such a design, an optical fiber can be inserted into the ferrule bore of the ferrule such that an end of the optical fiber is extended beyond the ferrule end face. As an example, after securing the optical fiber relative to the ferrule (e.g., by using a bonding agent in the bore), an optical surface may be formed on the end of the optical fiber at the front of the ferrule to form a terminal end of the optical fiber. Forming the optical surface may include cleaving the excessive optical fiber protruding from the ferrule end face. To reduce or eliminate scratches, cracks, or other blemishes on the cleaved end portion of the optical fiber that could otherwise cause optical attenuation, the cleaved end portion of the optical fiber can be polished to an end face to form an optical surface. At this optical surface, sometimes the position of the core of the optical fiber may not be within industry specifications, which can negatively impact optical communication by causing insertion loss. For example, the centration of the optical fiber depends on ferrule bore and optical fiber diameters and how the optical fiber is secured to the ferrule bore. Depending on the contact line of the fiber inside the ferrule bore, the optical axis of the optical fiber is offset with respect to the ferrule bore axis. This can cause significant lateral misalignment losses.

SUMMARY

Aspects of this disclosure involve forming a fiber bulge ("bulge") in an end of an optical fiber for positioning the optical fiber in a ferrule bore. Positioning of an optical fiber in a ferrule bore may be performed as part of an optical fiber connectorization process. In certain exemplary disclosed aspects, an end of an optical fiber is inserted into a ferrule bore of a ferrule. The end of the optical fiber is extended through a front opening of the ferrule bore (i.e., micro bore) beyond the front end face of the ferrule. A radiation energy source (e.g., a laser) is controlled to direct a focused energy to the end of the optical fiber extended from the front end face of the ferrule to expose and melt (i.e., deform through reflow) the end protruding from the front end face of the ferrule to form a bulge. The power and the exposure duration of the radiation energy source is controlled to melt the end of the optical fiber into a bulge of desired geometry and size. For example, a laser energy source may provide excellent control over the geometry and size of fiber deformation. The bulge is formed to include a proximal end, a melted terminal end, and a cross-sectional region between the proximal end and the melted terminal end. The cross-sectional region comprises an outer surface having a minimum outer diameter larger than the inner diameter of the ferrule bore. Thus, the optical fiber may be pulled back in the ferrule bore such that the outer surface of the cross-sectional region of the bulge interferes and engages with the front opening of the ferrule bore to position the optical fiber within the ferrule bore. Positioning of the optical fiber within the ferrule bore can reduce and/or improve insertion loss. The bulge may then be polished or further processed when the optical fiber is positioned within the ferrule bore to form an optical surface in the optical fiber.

Forming a bulge at an end of the optical fiber to interfere with and engage the front opening of the ferrule bore to position the optical fiber within the ferrule bore may avoid a cleaving step before polishing to form the optical surface. For example, if the bulge were instead formed in a mid-span location of an optical fiber, a fiber stub extending from the front end face of the ferrule would remain that would require cleaving before the optical surface was formed. Further, cleaving the optical fiber after being positioned in a ferrule bore may cause sharp edges to be present on the optical fiber that may otherwise damage a polishing film during polishing to form the optical surface. Also, use of the radiation energy source to melt the end of the optical fiber may also allow formation of a bulge sufficiently free of sharp edges that may allow a less aggressive polishing or even elimination of some polishing steps. Still further, the bulge could be further exposed to the energy from the radiation energy source to ablate (i.e., evaporate/remove) fiber material from an apex portion of the bulge to minimize the fiber material to be polished or to avoid polishing in a subsequent processing step(s).

The bulge may be formed in the end of the optical fiber such that the optical fiber is either centered about the lengthwise center axis of the ferrule bore or offset from the lengthwise center axis of the ferrule bore as desired. For example, a substantially symmetric bulge can be formed in the end of the optical fiber to align a lengthwise center axis of the optical fiber within the lengthwise center axis of the ferrule bore to center the optical fiber within the ferrule bore.

If the core-to-cladding concentricity error of an optical fiber having substantially symmetric bulge is zero, centering of the optical fiber within the ferrule bore will also center the fiber core of the optical fiber within the ferrule bore. Alternatively, as another example, an asymmetric bulge can be formed in the end of the optical fiber such that the lengthwise center axis of the optical fiber has an offset or eccentricity within the lengthwise center axis of the ferrule bore. For example, offsetting the optical fiber from the center of the ferrule bore may be desirable if aligning, adjusting, and/or tuning (e.g., quadrant tuning) the position of the fiber core and/or the ferrule bore to ensure that the location of the fiber core meets specific standards or prescribed specifications.

In one embodiment of the disclosure, a method of processing an optical fiber is provided. The method comprises inserting an end of the optical fiber through a rear opening of a ferrule bore of a ferrule, the ferrule bore having an inner diameter. The method also comprises extending the end of the optical fiber through the ferrule bore and through a front opening of the ferrule bore to protrude a distance beyond a front end face of the ferrule. The method also comprises melting at least a portion of the end of the optical fiber protruding from the front end face of the ferrule to form a bulge in the end of the optical fiber. The bulge comprises a proximal end, a melted terminal end, and a cross-sectional region between the proximal end and the melted terminal end. The cross-sectional region comprises an outer surface having a minimum outer diameter larger than the inner diameter of the ferrule bore.

In another embodiment of the disclosure, a ferrule assembly is provided. The ferrule assembly comprises a ferrule having a rear end face with a rear opening, a front end face with a front opening, and a bore extending between the front opening and the rear opening. The bore has an inner diameter. The ferrule assembly also comprises an optical fiber. The optical fiber comprises a melted terminal end. The optical fiber also comprises a bulge defining the melted terminal end. The bulge also comprises a proximal end and a cross-sectional region extending between the proximal end and the melted terminal end. The cross-sectional region has a minimum outer diameter larger than the inner diameter of the bore. The bulge is positioned in the bore such that a portion of the optical fiber is positioned within the bore of the ferrule, the melted terminal end of the optical fiber extends beyond the front end face of the ferrule, the proximal end of the bulge is positioned within the bore of the ferrule adjacent to the front opening, and at least a portion of the cross-sectional region of the bulge interferes and cooperatively engages with the front opening of the ferrule.

Additional features and advantages will be set forth in the detailed description which follows, and in part will be readily apparent to those skilled in the technical field of optical connectivity. It is to be understood that the foregoing general description, the following detailed description, and the accompanying drawings are merely exemplary and intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the description serve to explain principles and operation of the various embodiments. Features and attributes associated with any of the embodiments shown or described may be applied to other embodiments shown, described, or appreciated based on this disclosure.

FIG. 2 is an exploded perspective view of the fiber optic connector of FIG. 1;

FIGS. 3A-3E are schematic diagrams that illustrate exemplary side, cross-sectional views of a ferrule assembly during an exemplary process of forming a bulge in an optical fiber to position the optical fiber within a ferrule bore, in accordance with an embodiment of this disclosure;

FIG. 8A is a schematic view of an end face of an optical fiber;

FIGS. 8B-8E are schematic views of laser energy directed to the end of the optical fiber;

FIG. 9A is a schematic cross-sectional view of an exemplary ferrule assembly with an exemplary bulge having a Gaussian-shaped cross section formed in an end of an optical fiber by a laser processing apparatus to facilitate positioning the optical fiber within a ferrule bore, in accordance with an embodiment of this disclosure;

FIG. 9B is a close-up view of the ferrule assembly in FIG. 9A;

FIG. 9C is an exemplary diagram of radiation energy distribution emitted by the laser processing apparatus in FIG. 6 to form the bulge in the end of the optical fiber shown in the ferrule assembly in FIGS. 9A and 9B;

FIG. 9D is a schematic view of the optical fiber in FIGS. 9A and 9B with the bulge formed in the end of the optical fiber;

FIG. 10A is a schematic, cross-sectional view of an exemplary ferrule assembly with an exemplary bulge having a top hat-shaped cross section formed in an end of an optical fiber by a laser processing apparatus to facilitate positioning the optical fiber within a ferrule bore, in accordance with an embodiment of this disclosure;

FIG. 10B is a close-up view of the ferrule assembly in FIG. 10A;

FIG. 10C is an exemplary diagram of radiation energy distribution emitted by the laser processing apparatus in FIG. 6 to form the bulge in the end of the optical fiber shown in the ferrule assembly in FIGS. 10A and 10B;

FIG. 10D is a schematic view of the optical fiber in FIGS. 10A and 10B with the bulge formed in the end of the optical fiber;

FIG. 11A is a schematic, cross-sectional view of an exemplary ferrule assembly with an exemplary bulge having a Gaussian-shaped cross section formed in an end of an optical fiber by a laser processing apparatus to facilitate positioning the optical fiber within a ferrule bore, in accordance with an embodiment of this disclosure;

FIG. 11B is a close-up view of the ferrule assembly in FIG. 11A;

FIG. 11C is an exemplary diagram of radiation energy distribution emitted by the laser processing apparatus in FIG. 6 to form the bulge in the end of the optical fiber shown in the ferrule assembly in FIGS. 11A and 11B;

FIG. 11D is a schematic view of the optical fiber in FIGS. 11A and 11B with the bulge formed in the end of the optical fiber;

FIG. 12A is a schematic, cross-sectional view of an exemplary ferrule assembly with an exemplary bulge having a rounded-shaped cross section formed in an end of an optical fiber by a laser processing apparatus to facilitate positioning the optical fiber within a ferrule bore, in accordance with an embodiment of this disclosure;

FIG. 12B is a close-up view of the ferrule assembly in FIG. 12A;

FIG. 12C is an exemplary diagram of radiation energy distribution emitted by the laser processing apparatus in FIG. 6 to form the bulge in the end of the optical fiber shown in the ferrule assembly in FIGS. 12A and 12B;

FIG. 12D is a schematic view of the optical fiber in FIGS. 12A and 12B with the bulge formed in the end of the optical fiber;

FIGS. 14A-14E are schematic diagrams that illustrate exemplary side, cross-sectional views of a ferrule assembly during an exemplary process of forming an asymmetric bulge in an end of an optical fiber to locate the lengthwise center axis of the optical fiber at an offset or eccentricity to the lengthwise center axis of ferrule bore, in accordance with an embodiment of this disclosure.

DETAILED DESCRIPTION

Figure 1:
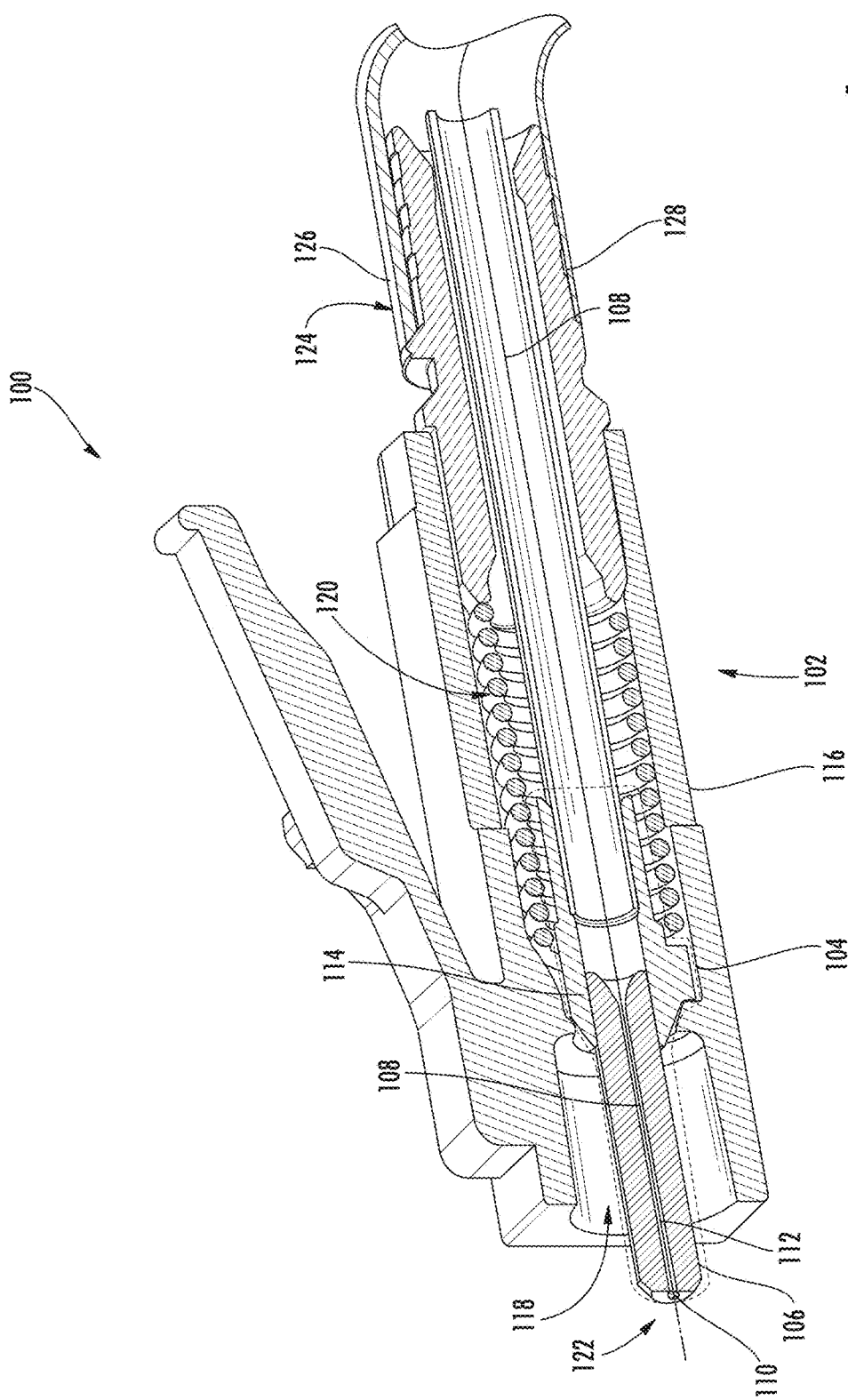
FIG. 1 is a perspective, cross-sectional view of an example of a fiber optic cable assembly including a fiber optic connector, in accordance with an embodiment of this disclosure.

FIG. 1 is a cross-sectional view illustrating one example of a fiber optic cable assembly 100 that includes a fiber optic connector 102 ("connector 102"). FIG. 2 is an exploded view of the connector 102 in FIG. 1. The connector 102 includes a ferrule assembly 104. As shown in FIG. 1, the ferrule assembly 104 includes a ferrule 106 terminating an optical fiber 108. As will be discussed in more detail below, the optical fiber 108 includes a fiber bulge 110 ("bulge 110") that is formed on an end of the optical fiber 108. The bulge 110 is formed when the end of the optical fiber 108 is inserted in a ferrule bore 112 ("bore 112" or "micro-hole 112") of the ferrule 106 and extended from a front end 122 of the ferrule 106. The bulge 110 positions the optical fiber 108 when the optical fiber 108 is pulled back in the bore 112. Before discussing these aspects in further detail, a general discussion of the connector 102 shown in FIGS. 1 and 2 will first be provided to better understand an example environment for the ferrule 106 and optical fiber 108 positioned therein.

As shown in FIGS. 1 and 2, the connector 102 includes the ferrule 106, a ferrule holder 114 from which the ferrule 106 extends, and a housing 116 (also referred to as "connector body") having a cavity 118 in which the ferrule 106 and the ferrule holder 114 are received. The ferrule holder 114 is retained within the housing 116 by internal geometry of the housing 116. More specifically, the ferrule holder 114 is biased forward within the housing 116 by a spring 120, but cooperates with internal geometry of the housing 116 to limit the forward movement. The ferrule holder 114 is retained close enough to a forward end of the housing 116 so that the front end 122 of the ferrule 106 projects beyond the housing 116. The front end 122 presents the optical fiber 108 for optical coupling with a mating component (e.g., another fiber optic connector; not shown).

Referring to FIG. 1, the optical fiber 108 may be part of a fiber optic cable 124 ("cable 124") that has been terminated with the connector 102 to form the fiber optic cable assembly 100. Like the connector 102, the particular cable 124 shown in FIG. 1 is merely an example. The cable 124 includes a jacket 126 that extends over a retention member 128 coupled to a rear portion of the housing 116. In a manner not shown herein, the cable 124 may further include strength members (e.g., aramid yarn) crimped or otherwise secured to the retention member 128 or housing 116. The connector 102 may also include a boot extending over the region where the cable 124 is secured to the connector 102 to help prevent sharp bends in the region.

Variations of these aspects will be appreciated by persons skilled in the design of fiber optic cable assemblies. For example, although the fiber optic connector 102 is shown in FIG. 1 in the form of a LC-type connector, the methods and features described below may be applicable to different connector designs. This includes SC, ST, and MPO-type connectors, for example, and other single-fiber or multi-fiber connector designs. Again, the embodiment shown in FIG. 1 is merely an example of a fiber optic connector 102 and fiber optic cable assembly 100 that are ultimate exemplary products of the methods described below involving the optical fiber 108 and ferrule 106. The general overview has been provided simply to facilitate discussion.

Figure 3A:
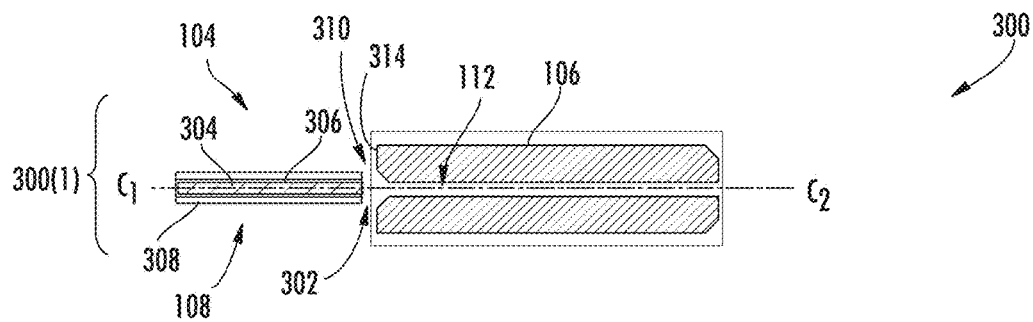

FIGS. 3A-3E are schematic diagrams that illustrate exemplary side, cross-sectional views of the ferrule assembly 104 during an exemplary process 300 of forming the bulge 110. In particular, FIG. 3A illustrates the ferrule assembly 104 in FIGS. 1 and 2 in a first exemplary process stage 300(1) before forming the bulge 110 in the optical fiber 108. As shown in FIG. 3A, the optical fiber 108 is cleaved to form an end 302 to prepare the optical fiber 108 to be inserted into the bore 112 of the ferrule 106 through a rear opening 310 in the rear end face 314 of the ferrule 106. In this example, the optical fiber 108 is comprised of a fiber core 304 surrounded by a cladding 306 and a coating 308. The optical fiber 108 has a lengthwise center axis $C_1$. If the core-to-cladding concentricity error of the optical fiber 108 is zero, the lengthwise center axis $C_1$ of the optical fiber 108 will also be the lengthwise center axis of the fiber core 304. The bore 112 of the ferrule 106 has a lengthwise center axis $C_2$.

Figure 3B:
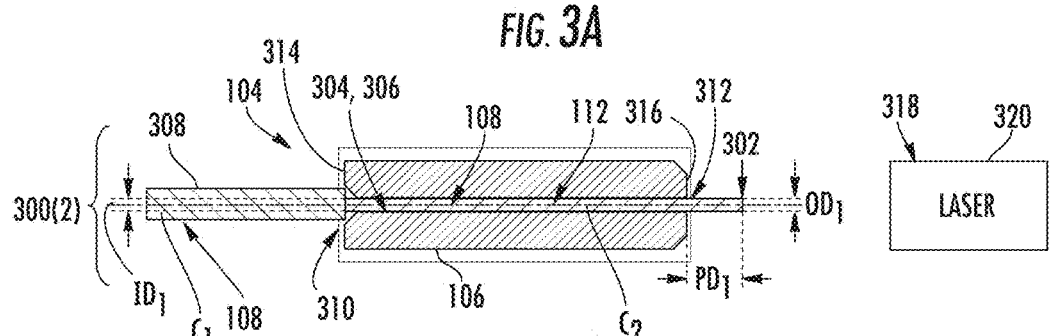

FIG. 3B illustrates a next exemplary process stage 300(2) before forming the bulge 110 in the end 302 of the optical fiber 108. The coating 308 surrounding the optical fiber 108 may be removed prior to preparing the optical fiber 108 to be inserted into the bore 112. The end 302 of the optical fiber 108 is inserted through a rear opening 310 of the bore 112 and extended through the bore 112 and a front opening 312 of the bore 112. The outer diameter $OD_1$ of the optical fiber 108 is less than the inner diameter $ID_1$ of the bore 112 so that the optical fiber 108 can pass through the bore 112 without interference. For example, the outer diameter $OD_1$ of the optical fiber 108 may be 125 microns (μm), and the inner diameter $ID_1$ of the bore 112 may be between 126-130 μm. The end 302 of the optical fiber 108 is extended through the front opening 312 and beyond the front end face 316 of the ferrule 106 by a protrusion distance $PD_1$. For example, the protrusion distance $PD_1$ may be between 100 μm and 3000 μm, as an example.

The protrusion distance $PD_1$ may help minimize heat conduction by the ferrule 106 when radiation energy is directed to the end 302 of the optical fiber 108 to form the bulge 110 in a later processing step. For example, a radiation energy source 318 may be provided to direct light to the end 302 of the optical fiber 108 to form the bulge 110. In one example, as discussed in more detail below, the radiation energy source 318 may be a laser 320. Radiated energy conducted by the ferrule 106 reduces the heat energy generated at the end 302 of the optical fiber 108. If the end 302 of the optical fiber 108 is too close to the front end face 316 of the ferrule 106, the radiated energy level directed at the end 302 may have to be increased to compensate for heat loss through conduction by the ferrule 106. This may cause the end 302 of the optical fiber 108 to be ablated and evaporate instead of being deformed (e.g., melting) to form the bulge 110. Conversely, if the end 302 of the optical fiber 108 is extended too far from the front end face 316 of the ferrule 106, the end 302 may bend with respect to the lengthwise center axis $C_2$ of the bore 112. Thus, if the radiation energy source 318 is aligned based on lengthwise center axis $C_2$ of the bore 112 in such a situation, the bulge 110 may not be properly formed of the desired geometry and/or size.

Figure 3C:
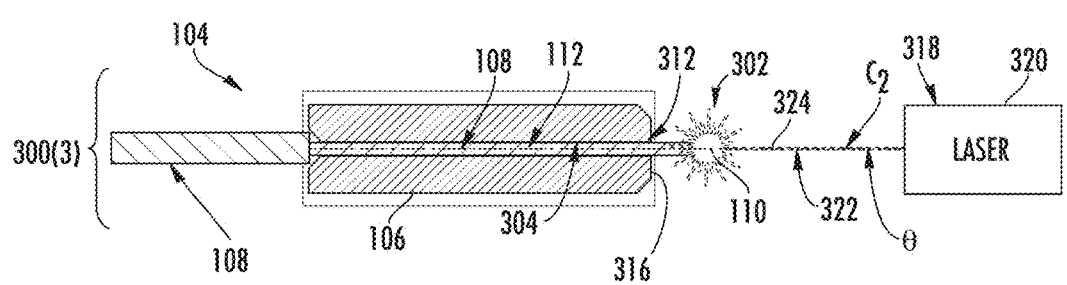
Figure 3D:
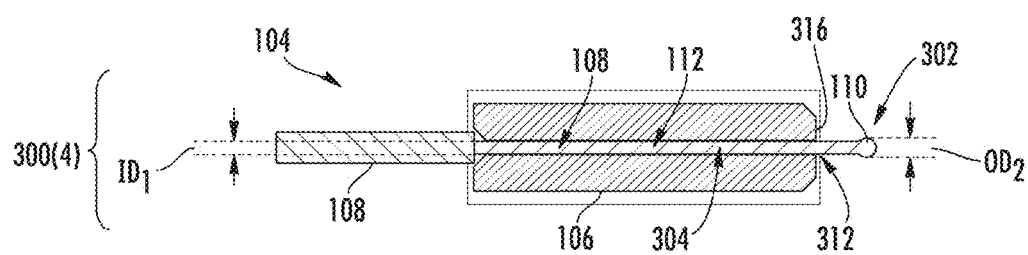

FIG. 3C illustrates a next exemplary process stage 300(3) for forming the bulge 110 in the end 302 of the optical fiber 108 after the end 302 of the optical fiber 108 is extended the protrusion distance $PD_1$ from the front end face 316 of the ferrule 106 (FIG. 3B). In this process stage 300(3) in FIG. 3C, the radiation energy source 318, provided in the form of a laser 320 in this example, is controlled to emit radiation energy 322 in the form of a light 324 at an incidence angle Θ towards the end 302 of the optical fiber 108 protruding from the front end face 316 of the ferrule 106. In this example, the incidence angle Θ is approximately zero degrees because the laser 320 is aligned such that the light 324 is directed head-on to the end 302 of the optical fiber 108 along the lengthwise center axis $C_1$ of the optical fiber 108. The laser 320 is controlled such that the radiation energy 322 causes the end 302 of the optical fiber 108 to melt (i.e., reflow) to form the bulge 110 in the end 302, as shown in the next exemplary process stage 300(4) in FIG. 3D. For example, the entirety of the end 302 of the optical fiber 108, or a portion thereof, could be melted by the radiation energy 322 to form the bulge 110. The bulge 110 is formed such that the outer diameter $OD_2$ of the bulge 110 is larger than the inner diameter $ID_1$ of the bore 112, as shown in FIG. 3D.

Note that if an adhesive (e.g., epoxy or another bonding agent) is inserted into the bore 112 or on the optical fiber 108 in FIG. 3A, the laser 320 could be controlled in a preliminary step to remove the adhesive from the optical fiber 108 protruding from the front end face 316 of the ferrule 106. Any adhesive present on the end 302 of the optical fiber 108 could first be evaporated with lower laser power before laser processing to form the bulge 110. Otherwise, some of the radiation energy 322 would be absorbed by the adhesive during the laser processing to form the bulge 110 in the process stage 300(3).

Thereafter, after formation of the bulge 110 in the end 302 of the optical fiber 108, the optical fiber 108 can be pulled away from the ferrule 106 in direction $D_1$ by a pulling force, as shown in a next exemplary process stage 300(5) in FIG. 3E. Because the bulge 110 has a larger outer diameter $OD_2$ than the inner diameter $ID_1$ of the bore 112, the bulge 110 interferes and engages with the front opening 312 of the bore 112 when the optical fiber 108 is pulled back along direction $D_1$. Positioning of the optical fiber 108 within the bore 112 positions the fiber core 304 relative to the ferrule 106. The pulling force on the optical fiber 108 may be maintained until the temperature of the ferrule 106 reaches approximately 100 degrees Celsius or less to allow the ferrule 106 to cool down, as an example. Positioning the optical fiber 108 within the bore 112 may improve alignment between the fiber core 304 of the optical fiber 108 and a true center of the ferrule 106 to reduce and/or improve insertion loss. This positioning may also be performed as part of a connectorization process where the ferrule assembly 104 is provided as part of a fiber optic connector, such as connector 102 in FIGS. 1 and 2, and installed on a fiber optic cable, such as cable 124. The bulge 110 forms an optical surface that can transmit and receive light. However, the bulge 110 may be cleaved and/or polished down to a substantially planar end face (not shown) after the optical fiber 108 is positioned within the bore 112 to allow for more precise optical alignment with a mated optical fiber for light transfer. The bulge 110 may be polished down to a desired distance from the front end face 316 to minimize an air gap between the end face of the optical fiber 108 and a mated optical fiber to meet fiber optic connector industry standards.

Further, forming the bulge 110 in the end 302 of the optical fiber 108 may avoid a cleaving step before polishing to form an optical surface in the optical fiber 108. For example, if a bulge were formed in a mid-span location of the optical fiber 108 instead, a fiber stub extending from the front end face 316 of the ferrule 106 would remain that would require cleaving before further processing of the bulge was performed. Further, cleaving an optical fiber after being positioned in a ferrule bore of a ferrule may cause sharp edges to be present in the optical fiber that may otherwise damage a polishing film during polishing.

FIG. 3E provides additional exemplary details of the bulge 110 and how the bulge 110 assists in positioning of the optical fiber 108 and the fiber core 304 in the bore 112. In this regard, as is further shown in FIG. 3E, the bulge 110 includes a proximal end 328, a melted terminal end region 330 (also referred to as "terminal end 330" herein) that defines a distal end 332 of the bulge 110, and a cross-sectional region 334 between the proximal end 328 and the melted terminal end 330. The cross-sectional region 334 includes an outer surface 336 surrounding the fiber core 304. The outer surface 336 has a minimum outer diameter $OD_2$ larger than the inner diameter $ID_1$ of the bore 112. For example, the inner diameter $ID_1$ of the bore 112 may be between 126 and 130 μm.

Further in this example, the bulge 110 is formed in the end 302 of the optical fiber 108 such that the cross-sectional region 334 is substantially symmetrical about the lengthwise center axis $C_1$ of the optical fiber 108. In this manner, the bulge 110 will align the lengthwise center axis $C_1$ of the optical fiber 108 with the lengthwise center axis $C_2$ of the bore 112 when the optical fiber 108 is pulled back in the bore 112 and the bulge 110 interferes with the front opening 312 of the bore 112. In other words, in this example, the outer surface 336 of the cross-sectional region 334 has a substantially symmetrical radius $R_1$ about the lengthwise center axis $C_1$ of the optical fiber 108. When the optical fiber 108 is pulled away from the ferrule 106 in direction $D_1$, as shown in FIG. 3E, substantially all of the outer surface 336, in a given plane $P_1$ orthogonal to the lengthwise center axis $C_2$ of the bore 112, where the minimum outer diameter $OD_2$ of the cross-sectional region 334 is greater than the inner diameter $ID_1$ of the bore 112, will be substantially equally spaced by distance $PD_2$ from the front opening 312 of the ferrule 106. Thus, substantially all portions 338 of the outer surface 336 interfere and engage with the front opening 312 of the bore 112 when spaced by distance $PD_2$ from the front opening 312 of the bore 112. The proximal end 328 of the bulge 110 may have a diameter that is substantially the same as a nominal (i.e., stated) diameter of the optical fiber 108 such that the proximal end 328 of the bulge 110 can be pushed into the front opening 312 when the optical fiber 108 is pulled back in the ferrule 106 in direction $D_1$.

Note that if the core-to-cladding concentricity error of the optical fiber 108 is zero, the lengthwise center axis $C_1$ of the optical fiber 108 would also be the lengthwise center axis of the fiber core 304. Thus, centering the optical fiber 108 about the lengthwise center axis $C_2$ of the bore 112 would also center the fiber core 304 about the lengthwise center axis $C_2$ of the bore 112.

Note that the bulge 110 could also be formed in the end 302 of the optical fiber 108 to form an asymmetrical cross-section region. In other words, the bulge 110 could be formed such that the outer surface 336 of the cross-sectional region 334 has an asymmetrical radius about a lengthwise center axis $C_1$ of the optical fiber 108 around the circumference of the cross-sectional region 334. Thus, when the optical fiber 108 is pulled away from the ferrule 106 in direction $D_1$, the portions of the outer surface 336 in a given plane $P_1$ orthogonal to a lengthwise center axis $C_2$ of the bore 112, where the minimum outer diameter $OD_2$ of the cross-sectional region 334 is greater than the inner diameter $ID_1$ of the bore 112, will not be substantially equally spaced from the front opening 312 of the ferrule 106. This causes the lengthwise center axis $C_1$ of the optical fiber 108 to be offset with the lengthwise center axis $C_2$ of the bore 112. Offsetting the optical fiber 108 from the lengthwise center axis $C_2$ of the bore 112 may be desirable if aligning, adjusting, and/or tuning (e.g., quadrant tuning) the position of the fiber core 304 to ensure that the location of the fiber core 304 meets specific standards or prescribed specifications, such as tuning to meet a "key hole" standard. For example, the offset distance between the lengthwise center axis $C_2$ of the bore 112 and a true center of the ferrule 106 at the front end face 316 of the ferrule 106 could be determined. The formation of an asymmetric bulge in the end 302 of the optical fiber 108 could then be at least partially based on this determined offset distance. Thus, when an optical fiber 108 is pulled back in the bore 112 towards the rear opening 310, the bulge will interfere and engage with the front opening 312 of the bore 112 to substantially align the lengthwise center axis $C_1$ of the optical fiber 108 (which may also be the lengthwise center axis of the fiber core 304 if there is no mismatch in concentricity between the fiber core 304 and the fiber cladding 306) with a true center of the ferrule 106 at the front opening 312 of the bore 112.

The bulge 110 can be formed of different geometries and sizes as desired. For example, it may be desired to form the bulge 110 with a reduced protrusion distance from the front end face 316 of the ferrule 106 to minimize the amount of fiber material to be polished after ablation and possibly avoid an additional cleaving step. Further, it may be desired to form bulge 110 with rounded features to minimize or reduce sharp edges, which may also assist in avoiding an additional cleaving step. Providing the bulge 110 sufficiently devoid of sharp edges may reduce damages on polishing film on first contact of the polishing film to the bulge 110. Thus, less aggressive polishing may also be required based on the geometry and size of the bulge 110.

Further, there are different processes that can be employed to form the bulge 110. For example, as will be discussed in more detail below, the bulge 110 may be formed by focusing radiation energy on the end 302 of the optical fiber 108 to melt and deform the end 302. In this manner, the bulge 110 may be rounded to form the cross-sectional region 334 that has the outer surface 336 with an outer diameter $OD_2$ larger than the inner diameter $ID_1$ of the bore 112. It may also be desired to use a localized energy source that can be programmed to produce a focused and highly reproducible thermal radiation to the end 302 of the optical fiber 108. For example, a laser may be employed as the radiation energy source to provide good control over the geometry and size of the deformation of the end 302 of the optical fiber 108 to form the bulge 110. Also, a laser used to form the bulge 110 may also be used to perform an additional processing step of ablating (i.e., evaporating/removing) the bulge 110 after the optical fiber 108 is positioned in the bore 112. The bulge 110 formation and/or ablation can be done using lasers at different wavelengths.

Figure 4:
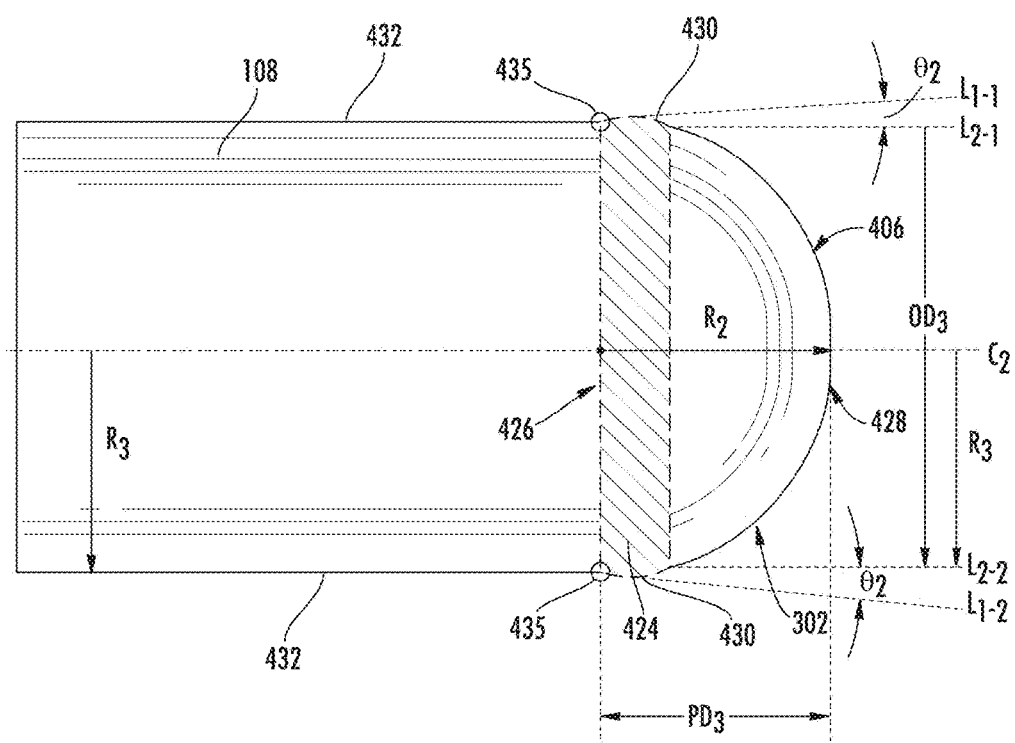
FIG. 4 is a side view of another exemplary bulge in an optical fiber, wherein the bulge comprises a proximal end, a melted terminal end, and a cross-sectional region between the proximal end and the melted terminal end, the cross-sectional region comprising an outer surface having an outer diameter larger than the inner diameter of the ferrule bore, in accordance with an embodiment of this disclosure.
Figure 5A:
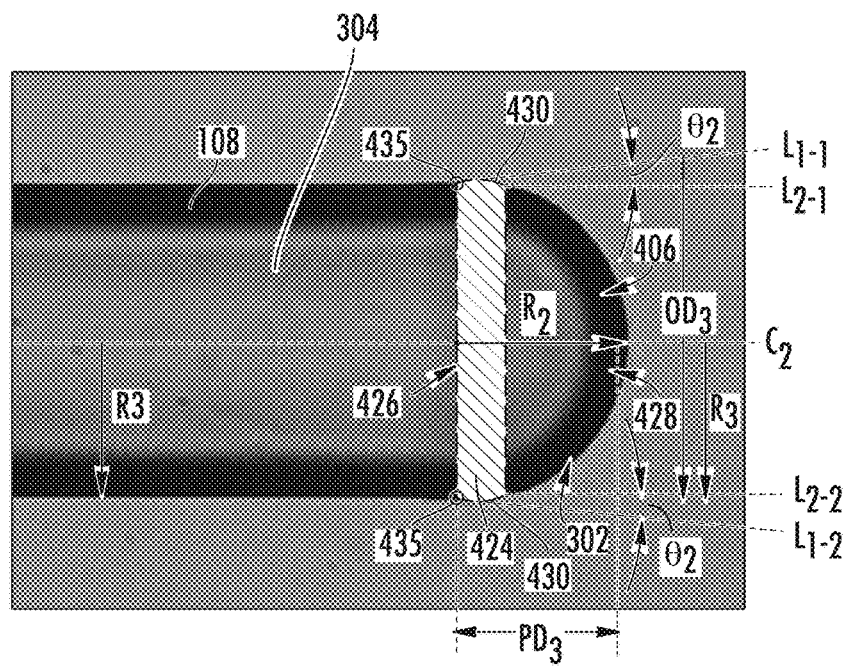
FIG. 5A is a photograph side view of the exemplary optical fiber with a bulge formed on the end of the optical fiber, in accordance with an embodiment of this disclosure.
Figure 5B:
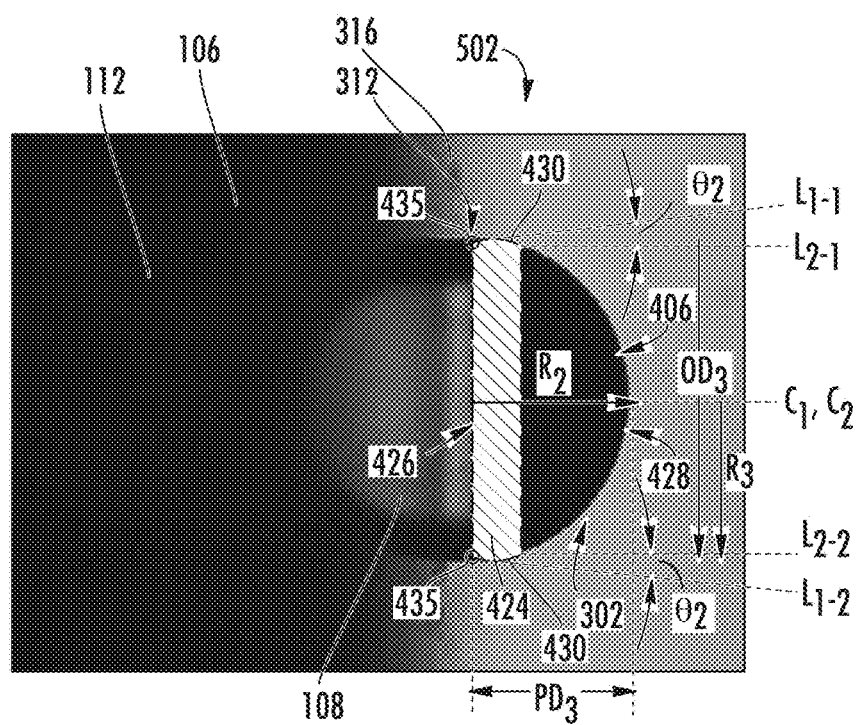
FIG. 5B is a photograph side view of the optical fiber in FIG. 5A inserted in a ferrule bore of a ferrule and pulled back from a front end in the ferrule bore such that an outer surface of the cross-sectional region of the bulge interferes with and engages the front opening of the ferrule bore to position the optical fiber within the ferrule bore, in accordance with an embodiment of this disclosure.

FIG. 4 is a side view of another exemplary fiber bulge 406 ("bulge 406") formed in the end 302 of the optical fiber 108 to position the optical fiber 108 within the bore 112 of the ferrule 106 in FIG. 1. FIG. 5A is a side view photograph of the bulge 406 formed in the end 302 of the optical fiber 108 in FIG. 4. FIG. 5B is a side view photograph of the bulge 406 formed in the end 302 of the optical fiber 108 in FIG. 4 interfering with the front opening 312 of the bore 112 in the front end face 316 of the ferrule 106 to position the optical fiber 108 along the lengthwise center axis $C_2$ of the bore 112.

As shown in FIGS. 4 and 5A, the protrusion distance $PD_3$ is less than the protrusion distance $PD_2$ of the bulge 110 in FIG. 3E. The bulge 406 includes a cross-sectional region 424 located between a proximal end 426 and a melted terminal end 428 of the bulge 406. The cross-sectional region 424 includes an outer surface 430 (e.g., on the fiber cladding 306) that surrounds the fiber core 304 of the optical fiber 108. The outer surface 430 has a minimum outer diameter $OD_3$ larger than an inner diameter $ID_1$ of the bore 112. Thus, lines $L_{1-1}$ and $L_{1-2}$ drawn tangent to the outer surface 430 are offset at an engagement angle $\Theta_2$ from respective lines $L_{2-1}$ and $L_{2-2}$ drawn tangent to the outer surface 432 of the optical fiber 108. The engagement angle $\Theta_2$ may be less than five degrees such as one or two degrees to provide a shallow taper and reduce the size of the outer diameter $OD_3$ of the cross-sectional region 424, but still allow the bulge 406 to interfere and engage with the front opening 312 of the bore 112 of the ferrule 106, as shown in FIG. 5B. Further in this example, the ratio of the radius $R_2$ of the bulge 406 to the radius $R_3$ of the optical fiber 108 is greater than 1.015 such that the bulge 406 is configured to interfere at an area 435 of the outer surface 430 and engage with the bore 112 of the ferrule 106. For example, if the radius $R_3$ of the optical fiber 108 is 62.5 µm, the radius $R_2$ of the bulge 406 may be 64 µm or greater. For an optical fiber 108 that has a radius $R_3$ of 62.5 µm, the protrusion distance $PD_3$ may be in the range of approximately 20-125 µm as an example. For example, the ratio of the minimum outer diameter $OD_3$ of the cross-sectional region 424 to the protrusion distance $PD_3$ may be between approximately 1.0 and 6.25. In this manner, the end 302 of the optical fiber 108 does not bend when extended beyond the front end face 316 of the ferrule 106 to melt the end 302 to form the bulge 406, but the end 302 is not so close to the ferrule 106 that the ferrule 106 conducts heat such that the bulge 406 cannot be created by melting the end 302 of the optical fiber 108.

As discussed above, a laser may be a well-suited radiation energy source to melt the end 302 of the optical fiber 108 to form a bulge to be used to position the optical fiber 108 in the bore 112 of the ferrule 106. A laser is capable of directing a focused light to the end 302 of the optical fiber 108 to transfer radiated energy to and melt the end 302 to form a bulge in the optical fiber 108.

Figure 6:
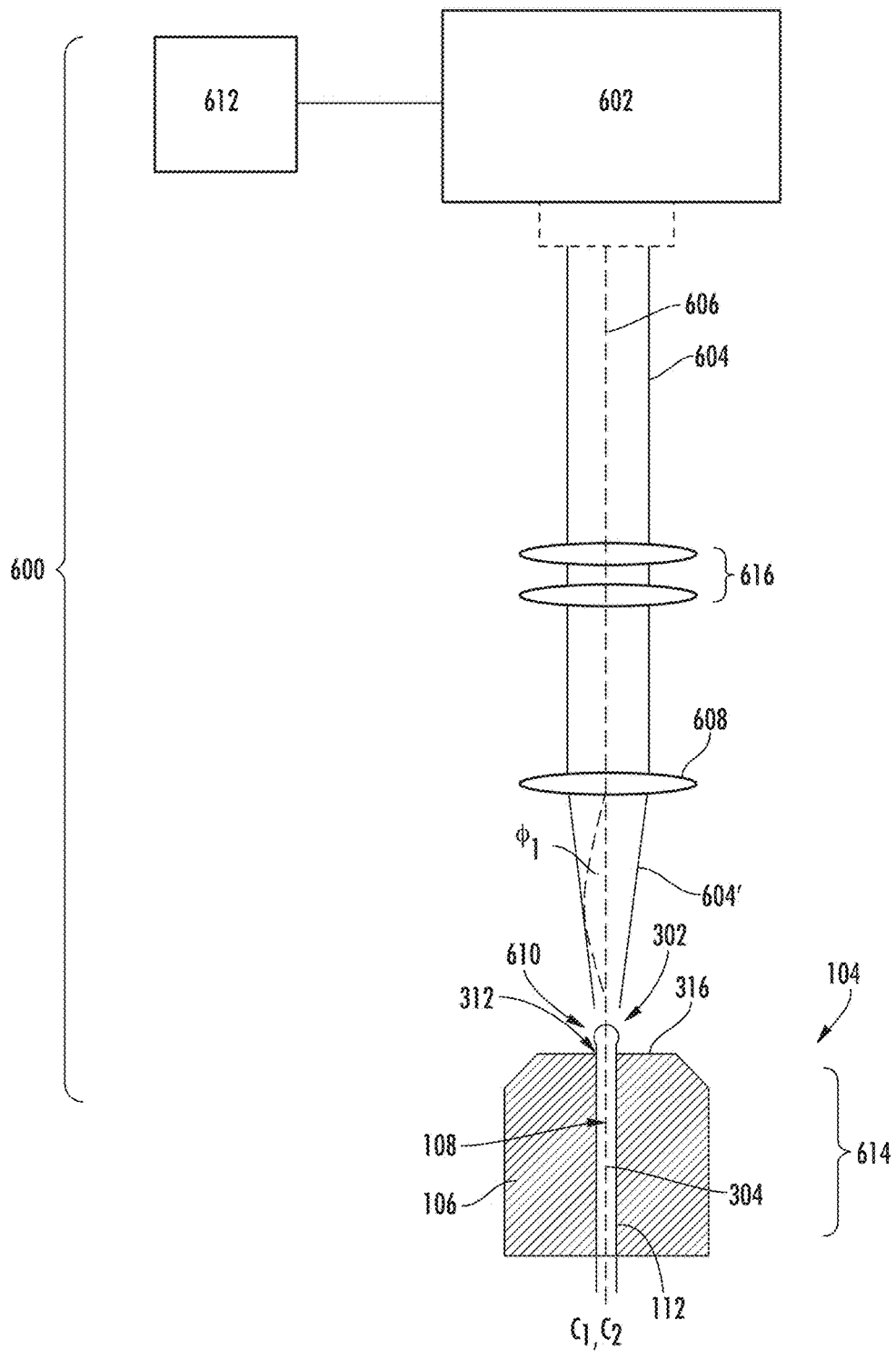
FIG. 6 is a side view of an exemplary apparatus including a laser processing apparatus that includes a laser configured to emit radiation energy in the form of a light focused on an end of an optical fiber in a ferrule assembly to form a bulge of a desired geometry and size in an end of the optical fiber, in accordance with an embodiment of this disclosure.

In this regard, FIG. 6 is a side view of an exemplary laser processing apparatus 600 that includes a laser 602. The laser 602 is configured to emit radiation energy in the form of a light focused on the end 302 of the optical fiber 108 in the ferrule 106 to form a bulge of a desired geometry and size. In this example, the laser 602 is configured to emit a light 604 in a laser beam path 606 "head-on" to the end 302 of the optical fiber 108. Note that the laser 602 could also be aligned to emit the light 604 at an angle to the end 302 of the optical fiber 108. For example, the laser 602 could be configured to emit the light 604 at up to a five degree angle towards the end 302 of the optical fiber 108 to avoid back reflection potentially damaging the laser 602. The laser 602 may be a quantum cascade laser (QCL), a carbon-monoxide (CO) laser, or carbon-dioxide ($CO_2$) laser, as non-limiting examples. As another example, the laser 602 may be a 200 nanometer (nm) to 355 nm excimer or solid state ultraviolet (UV) laser with pulsing capabilities (e.g., in picoseconds of range, e.g., 0.01 ns to 100 µs), as a non-limiting example. Femtosecond lasers may also be employed.

A fiber bulge 610 ("bulge 610") can be formed by the laser 602 in the end 302 of the optical fiber 108 at different wavelengths of the light 604. The laser 602 should be selected so that wavelength of the light 604 provides sufficient absorption in the silica fiber of the optical fiber 108 for melting. The higher the absorption, the shorter the length of optical fiber 108 over which the light 604 is absorbed. But at the same time, it is desired to select a wavelength for the light 604 that does not damage the ferrule 106, which is typically a ceramic material. Thus, it may be desired to select the wavelength of the light 604 such that light absorption by the ferrule 106 material is minimized. For example, as shown in the graph 700 in FIG. 7A, the wavelength range of the light 604 emitted by the laser 602 may be provided between 4.8 µm to 6.5 µm to provide sufficient absorption by the optical fiber 108. As shown in the graph 702 in FIG. 7B, the material of the ferrule 106, which may be a Zirconia material, may be substantially transmissive at a wavelength range of the light 604 between 4.8 µm to 6.5 µm. As another example, the wavelength range of the light 604 may be provided between 5.2 µm to 6.0 µm.

With continuing reference to FIG. 6, one or more focusing lenses 608 can be provided in the laser processing apparatus 600 between the laser 602 and the ferrule assembly 104. The focusing lens(es) 608 focuses the light 604 into a smaller, focused light 604' head-on onto the end 302 of the optical fiber 108 to concentrate the energy distribution of the light 604 and melt the end 302 to form the bulge 610 in the optical fiber 108. The focusing width may be 125 µm, as a non-limiting example.

By emitting the light 604 from the laser 602 head-on to the end 302 of the optical fiber 108, the bulge 610 of a desired geometric shape can be formed in the end 302 of the optical fiber 108. The laser 602 is under control of a controller 612 to control the emission of the light 604 from the laser 602. By "head-on laser shaping," it is meant that the light 604 is directed by the laser 602 in the laser beam path 606 collinear or substantially collinear to the lengthwise center axis $C_1$ of the optical fiber 108. Substantially collinear means that the light 604 is directed by the laser 602 in the laser beam path 606 at an acute angle $\varphi_1$ up to and including 30 degrees to the lengthwise center axis $C_1$ of the optical fiber 108. The end 302 of the optical fiber 108 is exposed to the light 604 to form the bulge 610. If desired, the optical fiber 108 may be rotated to homogenize the energy distribution of the light 604 and/or to create different geometries of the bulge 610 in the end 302 of the optical fiber 108.

With continuing reference to FIG. 6, to facilitate head-on laser processing of the end 302 of the optical fiber 108, the ferrule assembly 104 is positioned relative to the laser beam path 606 such that the laser beam path 606 is collinear or substantially collinear to the lengthwise center axis $C_1$ of the optical fiber 108. The controller 612 may be configured to control the laser 602 to control the duration of the exposure of the end 302 of the optical fiber 108 to the light 604 to control the distance between the final prepared bulge 610 and the front end face 316 of the ferrule 106. The intensity of the light 604 as well as the duration of exposure are factors that control energy absorption by the optical fiber 108 to form the bulge 610. For example, the laser 602 may be controlled by the controller 612 to emit the light 604 to raise the temperature of the end 302 of the optical fiber 108 to approximately 1600 degrees Celsius to 2700 degrees Celsius which will cause thermal flowing of the end 302. Pure silica begins to melt at approximately 1800 degrees Celsius, but may start to soften at 1600 degrees Celsius.

The ferrule 106 may be made of a material that is also absorptive to the energy of the light 604. For example, the ferrule 106 may be made of zirconia as a non-limiting example. Thus, it may be desired to prevent or reduce energy absorption of the light 604 by the ferrule 106 so as to not damage the ferrule 106.

With continuing reference to FIG. 6, the laser processing apparatus 600 may also include one or more light shaping optic(s) 616. For example, the light shaping optic(s) 616 may be a diffractive optic. The light shaping optic(s) 616 receives the light 604 and controls the cross-section energy distribution of the light 604 to laser shape the bulge 610 on the end 302 of the optical fiber 108 according to the desired geometry.

Other geometries and shapes of formed bulges in the end 302 of the optical fiber 108 shown in the end view in FIG. 8A are possible based on the cross-section energy distribution of the light 604 emitted to the end 302, such as by the laser 602 in FIG. 6. For example, FIG. 8B illustrates a Gaussian-shaped cross-section energy focused on the end 302 of the optical fiber 108 to create a fiber bulge 800 ("bulge 800") having Gaussian-shaped cross-sectional region 802 to create an interference with the front opening 312 of the bore 112 of the ferrule 106 (FIG. 3E). FIG. 8C illustrates a top hat-shaped cross-section energy focused on the end 302 of the optical fiber 108 to create a fiber bulge 804 ("bulge 804") having a top hat-shaped cross-sectional region 806 to create an interference with the front opening 312 of the bore 112 of the ferrule 106 (FIG. 3E). FIG. 8D illustrates a concentric-shaped (i.e., ring-shaped or donut-shaped) cross-section energy focused on the end 302 of the optical fiber 108 to create a fiber bulge 808 ("bulge 808") having a ring-shaped cross-sectional region 810 to create an interference with the front opening 312 of the bore 112 of the ferrule 106 (FIG. 3E). FIG. 8E illustrates a multi-spot cross-section energy focused on the end 302 of the optical fiber 108 to create a fiber bulge 812 ("bulge 812") having a multi-spot-shaped cross-sectional region 814 to create an interference with the front opening 312 of the bore 112 of the ferrule 106 (FIG. 3E). The multi-spot-shaped cross-sectional region 814 includes multiple melted portions 816A-816C in the form of small bulges or swollen areas that can cause the bulge 812 to interfere with the front opening 312 of the bore 112 of the ferrule 106 (FIG. 3E). The size of the light beam used to form the multiple melted portions 816A-816C may be one-fourth of the size of the end 302 of the optical fiber 108. The multiple melted portions 816A-816C may be formed in the end 302 to provide either a symmetric or asymmetric bulge 812.

FIGS. 9A-12D, described in more detail below, illustrate examples of cross section energy distributions of the light that can be provided to form a bulge on the end 302 of the optical fiber 108 according to the desired geometry and taking into consideration the material type and energy absorption characteristics of the optical fiber 108.

For example, it may be desired to laser shape a rounded bulge in the end 302 of the optical fiber 108. In this regard, FIG. 9A is a side view of an exemplary ferrule assembly 902 comprising an exemplary rounded fiber bulge 906 ("rounded bulge 906") formed in the end 302 of the optical fiber 108. FIG. 9B is a close-up side view of the ferrule assembly 902 in FIG. 9A illustrating a close-up view of the rounded bulge 906. The rounded bulge 906 can be formed by the laser processing apparatus 600 in FIG. 6 emitting the light 604 onto the end 302 of the optical fiber 108. FIG. 9C is a schematic view of Gaussian-shaped cross-section energy distribution 900 of light 904 emitted by the laser 602 in the laser processing apparatus 600 in FIG. 6 to form the rounded bulge 906 in the end 302 of the optical fiber 108, as shown in FIG. 9D. The rounded bulge 906 includes a rounded end section 908 that includes an enlarged, rounded circumference portion 910 that has a cross-sectional outer diameter $OD_4$ greater than the inner diameter $ID_1$ of the bore 112. To form the rounded bulge 906, the melt/reflow rate of the end 302 about the lengthwise center axis $C_1$ of the optical fiber 108 is controlled to be less than the melt/reflow rate at the outer portions of the end 302 about axes $A_1$ and $A_2$. Thus, the Gaussian-shaped cross-section example as illustrated in FIG. 9C provides a lower melt/reflow rate of the end 302 about the lengthwise center axis $C_1$ of the optical fiber 108 than the outer portions of the end 302. In this regard, the energy of the light 904 is provided with less intensity about the lengthwise center axis $C_1$ of the optical fiber 108 and increases in intensity as a function of distance from the lengthwise center axis $C_1$ to provide a higher melting/reflow rate of the end 302 of the optical fiber 108 towards axes $A_1$ and $A_2$.

As another example, it may be desired to laser shape a substantially planar bulge in the end 302 of the optical fiber 108. In this regard, FIG. 10A is a side view of an exemplary ferrule assembly 1002 comprising an exemplary substantially planar fiber bulge 1006 ("substantially planar bulge 1006") formed in the end 302 of the optical fiber 108. FIG. 10B is a close-up side view of the ferrule assembly 1002 in FIG. 10A illustrating a close-up view of the substantially planar bulge 1006. The substantially planar bulge 1006 can be formed by the laser processing apparatus 600 in FIG. 6 emitting the light 604 onto the end 302 of the optical fiber 108. FIG. 10C is a schematic view of top hat-shaped cross-section energy distribution 1000 of light 1004 emitted by the laser 602 in the laser processing apparatus 600 in FIG. 6 to form the substantially planar bulge 1006 in the end 302 of the optical fiber 108 as shown in FIG. 10D. The substantially planar bulge 1006 includes a substantially planar end section 1008 that includes a flared circumference portion 1010 that has a cross-sectional outer diameter $OD_5$ greater than the inner diameter $ID_1$ of the bore 112. To form the top hat-shaped cross-section energy distribution 1000 of the light 1004 provided as a substantially planar energy distribution, the melt/reflow rate of the end 302 about the lengthwise center axis $C_1$ of the optical fiber 108 is controlled to be substantially equal to the melt/reflow rate at the outer portions of the end 302 about axes $A_1$ and $A_2$. In this regard, the energy of the light 1004 is provided with substantially the same intensity about the lengthwise center axis $C_1$ of the optical fiber 108 as towards axes $A_1$ and $A_2$.

As another example, it may be desired to laser shape a rounded flared bulge in the end 302 of the optical fiber 108. In this regard, FIG. 11A is a side view of an exemplary ferrule assembly 1102 comprising an exemplary rounded flared fiber bulge 1106 ("rounded flared bulge 1106") formed in the end 302 of the optical fiber 108. FIG. 11B is a close-up side view of the ferrule assembly 1102 in FIG. 11A illustrating a close-up view of the rounded flared bulge 1106. The rounded flared bulge 1106 can be formed by the laser processing apparatus 600 in FIG. 6 emitting the light 604 onto the end 302 of the optical fiber 108. FIG. 11C is a schematic view of a Gaussian-shaped cross-section energy distribution 1100 of light 1104 emitted by the laser 602 in the laser processing apparatus 600 in FIG. 6 to form the rounded flared bulge 1106 in the end 302 of the optical fiber 108. As shown in FIG. 11D, the rounded flared bulge 1106 includes a rounded end section 1108 that includes a flared circumference portion 1110 that has a cross-sectional outer diameter $OD_6$ greater than the inner diameter $ID_1$ of the bore 112. To form the Gaussian-shaped cross-section energy distribution 1100 of the light 1104, the melt/reflow rate of the end 302 about the lengthwise center axis $C_1$ of the optical fiber 108 is controlled to be less than the melt/reflow rate at the outer portions of the end 302 about axes $A_1$ and $A_2$. In this regard, the energy of the light 1104 is provided with less intensity about the lengthwise center axis $C_1$ of the optical fiber 108 than towards axes $A_1$ and $A_2$.

As another example, it may be desired to laser shape a rounded bulge in the end 302 of the optical fiber 108. In this regard, FIG. 12A is a side view of an exemplary ferrule assembly 1202 comprising an exemplary rounded fiber bulge 1206 ("rounded bulge 1206") formed in the end 302 of the optical fiber 108. FIG. 12B is a close-up side view of the ferrule assembly 1202 in FIG. 12A illustrating a close-up view of the rounded bulge 1206. The rounded bulge 1206 can be formed by the laser processing apparatus 600 in FIG. 6 emitting the light 604 onto the end 302 of the optical fiber 108. FIG. 12C is a schematic view of a Gaussian-shaped cross-section energy distribution 1200 of light 1204 emitted by the laser 602 in the laser processing apparatus 600 in FIG.

6 to form the rounded bulge 1206 in the end 302 of the optical fiber 108. As shown in FIG. 12D, the rounded bulge 1206 includes a rounded end section 1208 that includes a rounded circumference portion 1210 that has a cross-sectional outer diameter $OD_7$ greater than the inner diameter $ID_1$ of the bore 112. The cross-sectional outer diameter $OD_7$ of the rounded circumference portion 1210 is less than the cross-sectional outer diameter $OD_6$ of the flared circumference portion 1110 in FIG. 11D. To form the Gaussian-shaped cross-section energy distribution 1200 of the light 1204, the melt/reflow rate of the end 302 about the lengthwise center axis $C_1$ of the optical fiber 108 is controlled to be less than the melt/reflow rate at the outer portions of the end 302 about axes $A_1$ and $A_2$. In this regard, the energy of the light 1204 is provided with less intensity about the lengthwise center axis $C_1$ of the optical fiber 108 as towards axes $A_1$ and $A_2$.

After the bulge is formed in the end 302 of the optical fiber 108, and the optical fiber 108 is positioned within the bore 112, as shown for example in the bulge 110 in FIG. 3E above, it may be desired to further process the bulge (e.g., cleave and/or polish). However, the bulge 110 protrudes from the front end face 316 of the ferrule 106 and may need to be cleaved or ablated so that fiber material of the bulge 110 is first removed. However, laser processing can also be performed to ablate the bulge 110 as opposed to cleaving the bulge 110, if desired, to avoid the need for an extra cleaving step. For example, since laser processing is being employed to melt the end 302 of the optical fiber 108 to form the bulge 110, the same or a different laser used to form the bulge 110 may be employed to also ablate the bulge 110.

Figure 13A:
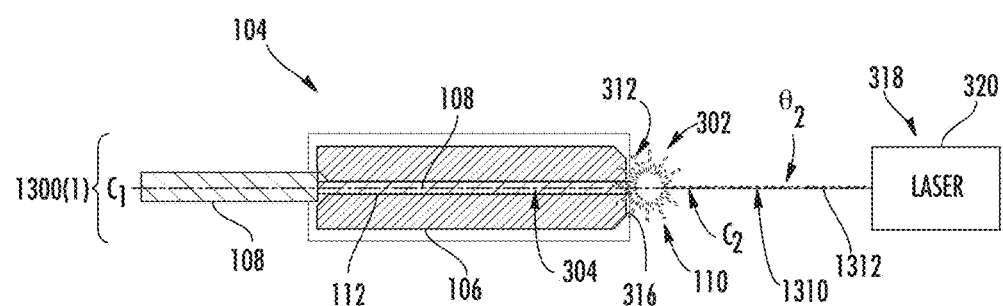
FIGS. 13A and 13B are schematic diagrams that illustrate exemplary side, cross-sectional views of a ferrule assembly during an exemplary process of ablating a bulge formed in an end of an optical fiber with a radiation energy source to remove fiber material from the bulge to form an optical surface, in accordance with an embodiment of this disclosure.
Figure 13B:
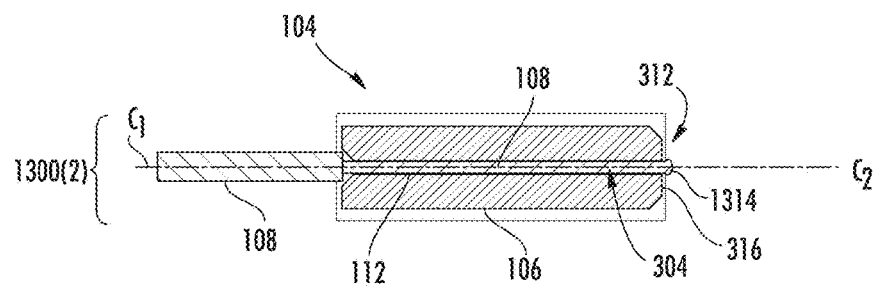

In this regard, FIG. 13A illustrates a ferrule assembly 104 in FIGS. 1A-2 in a subsequent exemplary process stage 1300(1) to ablate the bulge 110 in the end 302 of the optical fiber 108. As shown in FIG. 13A, after the bulge 110 has been formed in the end 302 of the optical fiber 108, the radiation energy source 318 provided in the form of the laser 320 in this example, can further be controlled to emit radiation energy 1310 in the form of a light 1312 at an incidence angle $\Theta_2$ towards the bulge 110. In this example, the incidence angle $\Theta_2$ is approximately zero (0) degrees, because the laser 320 is aligned such that the light 1312 is directed head-on to the bulge 110 along the lengthwise center axis $C_1$ of the optical fiber 108. The laser 320 is controlled such the light 1312 causes the bulge 110 to be ablated to remove fiber material from the bulge 110 to form an optical surface 1314, as shown in a second exemplary process stage 1300(2) in FIG. 13B. The optical surface 1314 protrudes less distance from the front end face 316 of the ferrule 106 than the bulge 110 in FIG. 13A. Thereafter, after ablation of the bulge 110 to form the optical surface 1314, the exemplary process stage 1300(2) may further involve optional polishing of the optical surface 1314 down to the front end face 316 of the ferrule 106.

Note that a laser, including any of the lasers discussed above, could also be controlled to provide a multiple-spot energy profile to direct a light at a plurality of focus spots on the end 302 of the optical fiber 108. Such may be provided to form multiple melted portions in the end 302 of the optical fiber 108 to form a bulge having a multi-spot-shaped cross-sectional region like the multi-spot-shaped cross-section region 814 in the bulge 812 formed in the end 302 of the optical fiber 108 in FIG. 8E for example.

Figure 7A:
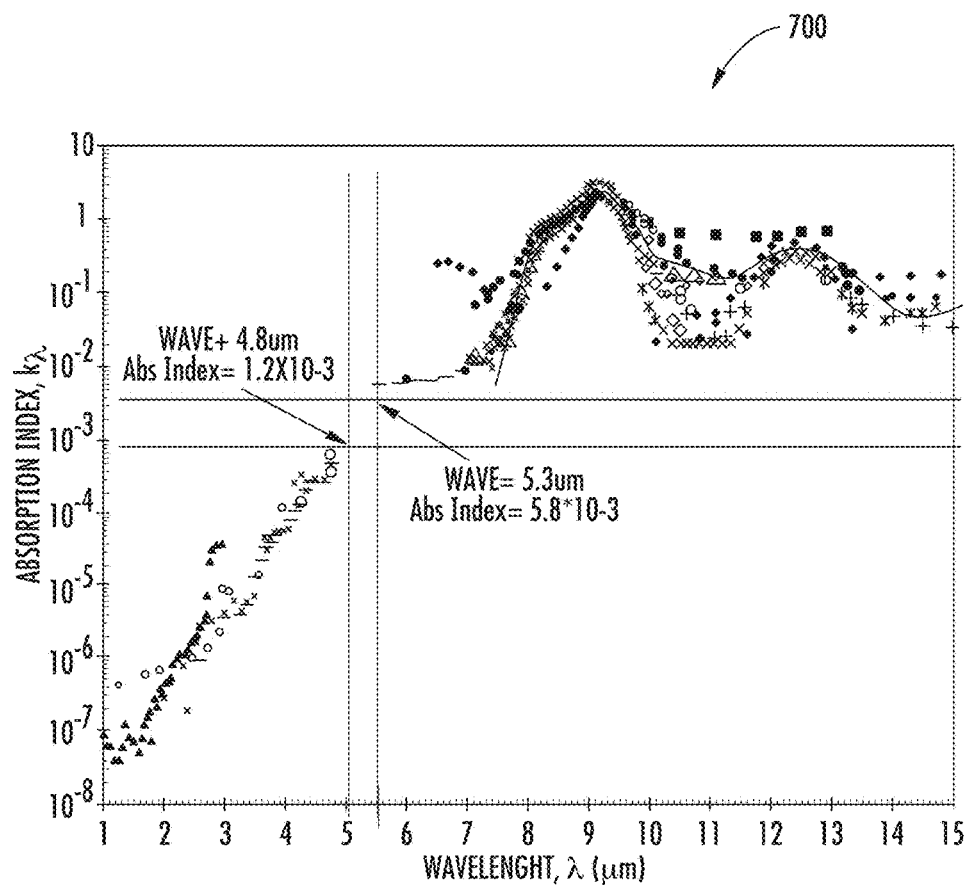
FIG. 7A is a graph illustrating an exemplary silica absorption as a function of radiation energy wavelength.
Figure 7B:
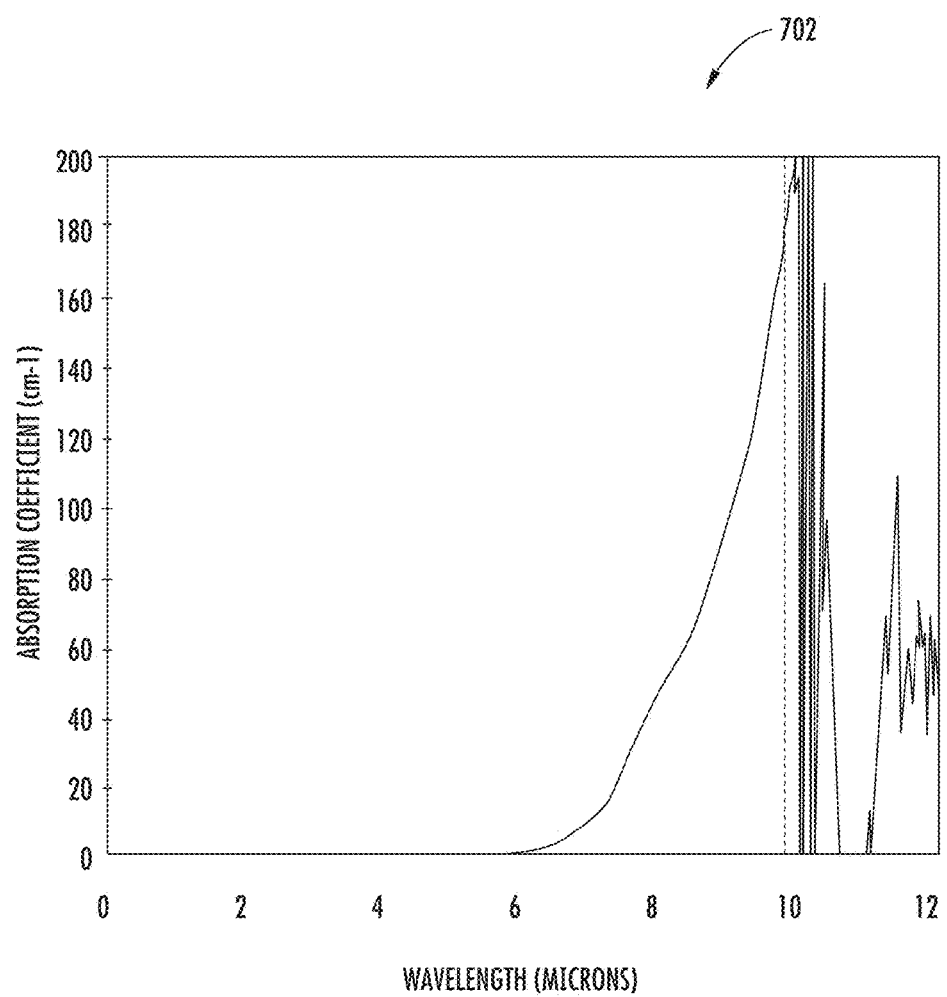
FIG. 7B is a graph illustrating an exemplary zirconium oxide absorption as a function of radiation energy wavelength.

Ablating the bulge 110 in the optical fiber 108 before polishing may reduce the amount of polishing needed to form the optical surface 1314. For example, as discussed above, the same laser 320 used to melt the end 302 of the optical fiber 108 to form the bulge 110 could also be used to ablate the bulge 110 to form the optical surface 1314. However, a different laser could also be employed. For example, a $CO_2$ laser or QCL laser may be employed. For example, the $CO_2$ laser may be controlled to emit a light at 1 Watt in a duration or pulse between 5-20 seconds. As shown in FIG. 7A, the absorption of silica at 9.2-9.5 µm reaches a maximum with absorption lengths less than 1 µm. Thus, employing a laser that emits the light 1312 at a wavelength between 9.2-9.5 µm for example may work well for ablation of the bulge 110. However, the ferrule 106 may also have some absorption at wavelengths between 9.2-9.5 µm, so care should be taken that the ferrule 106 is not damaged during ablation. Thus, it may be desired to direct the light 1312 at an incidence angle to the lengthwise center axis $C_1$ of the optical fiber 108 so as to avoid directing the light 1312 to the ferrule 106. The intensity, duration, and size of the light 1312 can be controlled to ablate the bulge 110 without damaging the ferrule 106.

As discussed above, an asymmetric bulge may alternatively be formed in the end 302 of the optical fiber 108 in the ferrule assembly 104 in FIG. 1. Forming an asymmetric bulge in the end 302 of the optical fiber 108 can provide for the optical fiber 108 to be positioned with an offset or eccentricity within the lengthwise center axis $C_2$ of bore 112 of the ferrule 106. For example, offsetting the optical fiber 108 from lengthwise center axis $C_2$ of bore 112 may be desirable if aligning, adjusting, and/or tuning (e.g., quadrant tuning) the position of the fiber core 304 and/or the bore 112 to ensure that the location of the fiber core 304 meets specific standards or prescribed specifications.

In this regard, FIGS. 14A-14E are schematic diagrams that illustrate exemplary side, cross-sectional views of a ferrule assembly 1400 during an exemplary process 1402 of forming an asymmetric fiber bulge 1406 ("asymmetric bulge 1406") in the end 302 of the optical fiber 108. The process 1402 involves forming an asymmetric bulge 1406 in the end 302 of the optical fiber 108 to position the optical fiber 108 within the bore 112 of the ferrule 106 about the lengthwise center axis $C_2$ of the bore 112, in accordance with an embodiment of this disclosure. Common components between the ferrule assembly 104 in FIG. 1 and the ferrule assembly 1400 in FIGS. 14A-14E are shown with common element numbers, and thus will not be re-described.

Figure 14A:
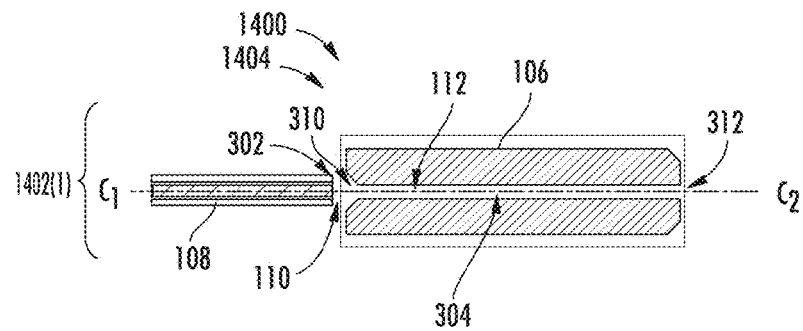

In this regard, FIG. 14A illustrates the fiber optic apparatus 1404 similar to the ferrule assembly 104 in FIG. 1 in a first exemplary process stage 1402(1) to form an asymmetric bulge in the end 302 of the optical fiber 108. As shown in FIG. 14A, the ferrule 106 is provided. The optical fiber 108 is cleaved to form the end 302 to prepare the optical fiber 108 to be inserted into the bore 112 through the rear opening 310 of the bore 112 to extend the optical fiber 108 therethrough and through the front opening 312. For example, the coating 308 surrounding the fiber core 304 may have been removed prior to preparing the optical fiber 108 to be inserted into the bore 112. In this processing step, before the optical fiber 108 is inserted into the bore 112, the ferrule 106 may be heated to liquefy an adhesive (e.g., epoxy or another bonding agent) that was pre-applied inside the bore 112 of the ferrule 106. In this manner, once the optical fiber 108 is inserted into and positioned within the bore 112 of the ferrule 106, an adhesive will secure the optical fiber 108 within the bore 112 of the ferrule 106.

Figure 14B:
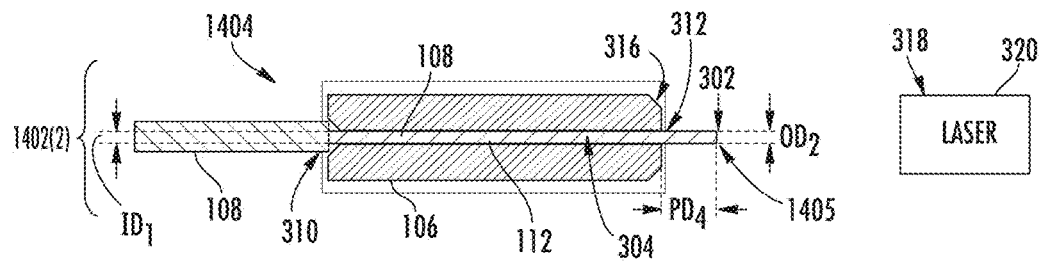

FIG. 14B illustrates a next exemplary process stage 1402(2) to form the asymmetric bulge 1406 in the end 302 of the optical fiber 108. The end 302 of the optical fiber 108 is inserted through the rear opening 310 of the bore 112 and extended through the bore 112 and front opening 312 to prepare the asymmetric bulge 1406 to be formed on the end 302. An end portion 1405 of the end 302 is exposed. The outer diameter $OD_2$ of the optical fiber 108 is less than the inner diameter $ID_1$ of the bore 112 so that the optical fiber 108 can pass through the bore 112 and be extended through the front opening 312 without interference. For example, the outer diameter $OD_2$ of the optical fiber 108 may be 125 µm. The inner diameter $ID_1$ of the bore 112 may be between 126-130 µm in this example. As will be discussed below, the asymmetric bulge 1406 is formed by directing radiated energy, such as from a laser, to the end 302 of the optical fiber 108. The insertion of the optical fiber 108 is controlled to extend beyond the front end face 316 of the ferrule 106 by a protrusion distance $PD_4$, which may be between 100 µm and 3000 µm, as an example.

The end 302 of the optical fiber 108 is extended the protrusion distance $PD_4$ from the front end face 316 of the ferrule 106 to minimize heat conduction by the ferrule 106 when radiation energy is directed to the end 302 of the optical fiber 108 to form the asymmetric bulge 1406 in a later processing step. For example, a radiation energy source 318 may be provided to direct light to the end 302 of the optical fiber 108 to form the bulge 110. In one example, as discussed in more detail below, the radiation energy source 318 may be a laser 320. Radiated energy conducted by the ferrule 106 reduces the heat energy generated at the end 302. If the extended end 302 of the optical fiber 108 is too close to the front end face 316 of the ferrule 106, the radiated energy level directed at the end 302 may have to be increased to compensate for heat loss through conduction by the ferrule 106. This may cause the end 302 of the optical fiber 108 to be ablated and evaporate instead of being deformed (e.g., melting) to form the asymmetric bulge 1406. Conversely, if the end 302 of the optical fiber 108 is extended too far from the front end face 316 of the ferrule 106, the end 302 may bend with respect to the lengthwise center axis $C_2$ of the bore 112. Thus, if the radiation energy source is aligned based on lengthwise center axis $C_2$ of the bore 112, the asymmetric bulge 1406 in such a situation may not be properly formed of the desired geometry and/or size.

Figure 14C:
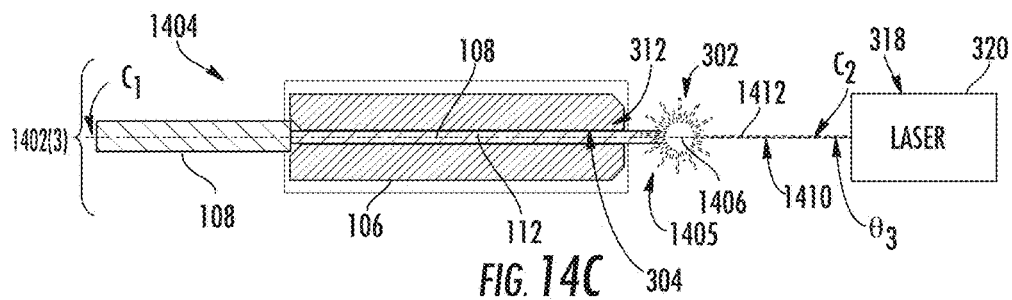
Figure 14D:
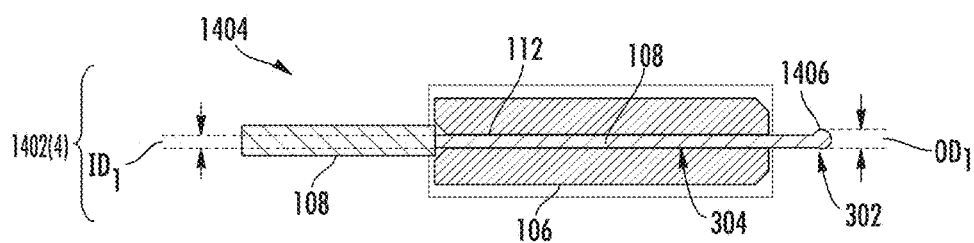

FIG. 14C illustrates a next exemplary process stage 1402(3) to form the asymmetric bulge 1406 in the end 302 of the optical fiber 108 after the end 302 of the optical fiber 108 is extended the protrusion distance $PD_4$ from the front end face 316 of the ferrule 106. In this process step, the laser 320 in this example, is controlled to emit radiation energy 1410 in the form of light 1412 at an incidence angle $\Theta_3$ towards the end 302 of the optical fiber 108 protruding from the front end face 316 of the ferrule 106. In this example, the radiation energy 1410 is emitted at the incidence angle $\Theta_3$ relative to the lengthwise center axis $C_1$ of the optical fiber 108 so that the melting of the end 302 is asymmetric about the lengthwise center axis $C_1$ of the optical fiber 108. The laser 320 is controlled such the radiation energy 1410 causes the end 302 of the bore 112 to melt (i.e., reflow) to form the asymmetric bulge 1406, as shown in the next exemplary process stage 1402(4) in FIG. 14D. The radiation energy 1410 causes at least a portion of the end 302 of the optical fiber 108 to melt (i.e., reflow) to form the asymmetric bulge 1406. For example, the entire end 302 of the optical fiber 108, as opposed to a portion of the end 302, could be melted by the radiation energy 1410 to form the asymmetric bulge 1406. The asymmetric bulge 1406 is formed such that the outer diameter $OD_1$ of the asymmetric bulge 1406 is larger than the inner diameter $ID_1$ of the bore 112 as shown in FIG. 14D, and also previously in FIG. 1B.

Note that if an adhesive (e.g., epoxy or another bonding agent) is inserted into the optical fiber 108 or on the optical fiber 108 in FIG. 14A such that the end 302 of the optical fiber 108 extended the protrusion distance $PD_4$ has adhesive present, the laser 320 could be controlled in a preliminary step to remove the adhesive from the end 302. The adhesive on the end 302 of the optical fiber 108 could first be evaporated with lower laser power before laser processing to form the asymmetric bulge 1406. Otherwise, some of the radiation energy 1410 would be absorbed by the adhesive during the laser processing to form the asymmetric bulge 1406 in the process stage 1402(3).

Thereafter, after formation of the asymmetric bulge 1406 in the end 302 of the bore 112, the optical fiber 108 can be pulled away from the ferrule 106 in direction $D_1$ by a pulling force, as shown in a next exemplary process stage 1402(5) in FIG. 14E. In this manner, the asymmetric bulge 1406 interferes and engages with the front opening 312 of the bore 112 to position the optical fiber 108 within the bore 112. Positioning the optical fiber 108 within the bore 112 may reduce and/or improve insertion loss of the ferrule assembly 1400. In this example, the asymmetric bulge 1406 has an asymmetrical cross-sectional region 1424 located between a proximal end 1426 and a melted terminal end 1428 that causes the optical fiber 108 to be positioned offset from or with an eccentricity from the lengthwise center axis $C_2$ of the bore 112. Areas 1432 of an asymmetric outer surface 1430 of the asymmetrical cross-sectional region 1424 interfere with the front opening 312 of the bore 112. The pulling force on the optical fiber 108 may be maintained until the temperature of the ferrule 106 reaches approximately 100 degrees Celsius or less to allow the ferrule 106 to cool down.

Persons skilled in fiber optic cable and/or connector assemblies will appreciate additional variations and modifications of the devices and methods already described. Additionally, where a method claim below does not explicitly recite a step mentioned in the description above, it should not be assumed that the step is required by the claim. Furthermore, where a method claim below does not actually recite an order to be followed by its steps or an order is otherwise not required based on the claim language, it is no way intended that any particular order be inferred.

The above examples are in no way intended to limit the scope of the present disclosure. It will be understood by those skilled in the art that while the present disclosure has been discussed above with reference to examples of embodiments, various additions, modifications and changes can be made thereto without departing from the spirit and scope of the disclosure as set forth in the claims.

What is claimed is:

1. A method of processing an optical fiber, the method comprising:
   inserting an end of the optical fiber through a rear opening of a ferrule bore of a ferrule, the ferrule bore having an inner diameter;
   extending the end of the optical fiber through the ferrule bore and through a front opening of the ferrule bore to protrude a distance beyond a front end face of the ferrule; and
   melting at least a portion of the end of the optical fiber protruding from the front end face of the ferrule to form a bulge in the end of the optical fiber, the bulge comprising a proximal end, a melted terminal end, and a cross-sectional region between the proximal end and the melted terminal end, the cross-sectional region comprising an outer surface having a minimum outer diameter larger than the inner diameter of the ferrule bore.

2. The method of claim 1, wherein the optical fiber at the proximal end of the bulge has an outer diameter smaller than the inner diameter of the ferrule bore.

3. The method of claim 1, wherein the entire end of the optical fiber is melted to form the bulge.

4. The method of claim 1, wherein the cross-sectional region further comprises a plurality of melted portions in the melted terminal end of the optical fiber.

5. The method of claim 1, further comprising applying a pulling force on the optical fiber towards the rear opening of the ferrule bore to cause at least a portion of the bulge to interfere with and engage the front opening of the ferrule bore.

6. The method of claim 1, further comprising polishing the melted terminal end of the optical fiber.

7. The method of claim 6, wherein the bulge is not cleaved prior to polishing.

8. The method of claim 1, further comprising ablating at least a portion of the bulge.

9. The method of claim 1, wherein extending the end of the optical fiber through the ferrule bore comprises causing the end to protrude a distance of between approximately 100 microns (µm) and 3000 µm beyond the front end face of the ferrule.

10. The method of claim 1, wherein the bulge formed by melting the at least a portion of the end of the optical fiber is symmetric about a lengthwise center axis of the optical fiber.

11. The method of claim 10, further comprising applying a pulling force on the optical fiber towards the rear opening of the ferrule bore to engage a portion of the bulge with the front opening of the ferrule bore to substantially align the lengthwise center axis of the optical fiber with a lengthwise center axis of the ferrule bore.

12. The method of claim 1, wherein the bulge formed by melting the at least a portion of the end of the optical fiber is asymmetric about a lengthwise center axis of the optical fiber.

13. The method of claim 12, further comprising determining an offset distance between a lengthwise center axis of the ferrule bore and a true center of the ferrule, wherein the offset distance is determined at the front end face of the ferrule, and further wherein the asymmetry of the bulge is based at least partially on the offset distance.

14. The method of claim 13, further comprising applying a pulling force on the optical fiber towards the rear opening of the ferrule bore to engage a portion of the bulge with the front opening of the ferrule bore to substantially align the lengthwise center axis of the optical fiber with the true center of the ferrule at the front opening of the ferrule bore.

15. The method of claim 1, wherein melting the at least a portion of the end of the optical fiber comprises controlling a radiation energy source to emit radiation energy to the at least a portion of the end of the optical fiber.

16. The method of claim 15, wherein controlling the radiation energy source comprises controlling a laser to emit light at an incidence angle to the at least a portion of the end of the optical fiber to melt the at least a portion of the end of the optical fiber.

17. The method of claim 16, wherein the laser is controlled to emit light having a wavelength between approximately 4.8 µm and 6.5 µm to melt the at least a portion of the end of the optical fiber.

18. The method of claim 16, wherein the laser is controlled to emit light having a wavelength between approximately 5.2 µm and 6.0 µm to melt the at least a portion of the end of the optical fiber.

19. The method of claim 16, wherein the laser is controlled to emit light having a wavelength between approximately 4.8 µm and 6.5 µm between approximately 0.1 Watts (W) and 1 W for a duration of approximately 1 seconds to 10 seconds to melt the at least a portion of the end of the optical fiber.

20. The method of claim 16, wherein the laser is controlled to emit light at an incidence angle less than 5 degrees to the at least a portion of the end of the optical fiber that is melted.

21. The method of claim 16, further comprising ablating at least a portion of the bulge.

22. The method of claim 21, wherein ablating the at least a portion of the bulge comprises controlling a second laser to emit a second light to the at least a portion of the bulge.

23. The method of claim 22, wherein controlling the second laser comprises controlling a $CO_2$ laser to emit the second light at approximately 0.5 W and 1.25 W between approximately five seconds and twenty seconds to the at least a portion of the bulge.

24. The method of claim 16, wherein the laser is controlled to emit light having a multiple-spot energy profile at the incidence angle to the at least a portion of the end of the optical fiber that is melted, the light forming a plurality of focus spots on the end of the optical fiber to melt the at least a portion of the end of the optical fiber.

* * * * *